United States Patent [19]

Tanaka

[11] Patent Number: 5,757,777
[45] Date of Patent: May 26, 1998

[54] APPARATUS FOR INSPECTING AND SETTING THE STATE OF ELECTRONICS AUDIO/VIDEO DEVICES

[75] Inventor: Shigeo Tanaka, Tokyo, Japan

[73] Assignee: Sony Corporation, Tokyo, Japan

[21] Appl. No.: 424,507

[22] PCT Filed: May 9, 1994

[86] PCT No.: PCT/JP94/00748

§ 371 Date: Jun. 19, 1995

§ 102(e) Date: Jun. 19, 1995

[30] Foreign Application Priority Data

Sep. 29, 1993 [JP] Japan ................... 5-242531

[51] Int. Cl.$^6$ .................................. H04J 1/16
[52] U.S. Cl. ............ 370/248; 340/825.06; 340/825.36; 370/242; 370/257; 379/269
[58] Field of Search ............... 364/514 B, 514 A, 364/514 C; 370/14, 94.1, 248, 389, 394, 257, 242; 371/55; 379/30, 269; 348/6, 2, 9, 125; 340/825.53, 825.06, 825.36, 825.44

[56] References Cited

U.S. PATENT DOCUMENTS

| | | | |
|---|---|---|---|
| 3,769,593 | 10/1973 | Williams | 340/825.53 |
| 4,194,090 | 3/1980 | Yabe et al. | 379/269 |
| 4,507,652 | 3/1985 | Vogt et al. | 340/825.36 |
| 4,916,432 | 4/1990 | Tice et al. | 340/825.06 |
| 5,073,919 | 12/1991 | Hagensick | 379/30 |
| 5,111,497 | 5/1992 | Bliven et al. | 370/14 |
| 5,130,793 | 7/1992 | Bordry et al. | 348/6 |
| 5,325,376 | 6/1994 | Ushio et al. | 371/55 |
| 5,550,978 | 8/1996 | Takahashi et al. | 370/94.1 |

FOREIGN PATENT DOCUMENTS

| | | | |
|---|---|---|---|
| 0015483 | 9/1980 | European Pat. Off. | C07F 9/38 |
| 0409308 | 1/1991 | European Pat. Off. | C08G 59/40 |
| 1169938 | 7/1989 | Japan | H01L 21/66 |
| 522303 | 1/1993 | Japan | H04L 12/40 |

*Primary Examiner*—Douglas W. Olms
*Assistant Examiner*—Shick Hom
*Attorney, Agent, or Firm*—Jay H. Maioli

[57] ABSTRACT

In order that an electronic device such as an audio or video device may be inspected and the state thereof may be set without making operation of the electronic device unstable when a rear cover is attached to the electronic device, an inspection jig (4) is connected through a D2B bus (2) serving as an external AV bus to electronic devices (TV1), (TV2) and (TV3). The state of the electronic device is checked by supplying a request signal to the electronic device (TV1), (TV2) or (TV3) through the D2B bus.

15 Claims, 22 Drawing Sheets

APPARATUS FOR INSPECTING AND SETTING THE STATE OF ELECTRONICS AUDIO/VIDEO DEVICES

TECHNICAL FIELD

The present invention relates to an electronic device system for use in inspecting AV devices (audio/video devices) and inspecting the connected states thereof the invention including electronic devices applied to the electronic device system, an inspecting apparatus and a state setting apparatus.

BACKGROUND ART

When television receivers are manufactured, inspection of substrate level has heretofore been carried out by using a pin jig and an internal bus, such as an I²C bus. Moreover, assembled television receivers also are inspected by using the I²C bus.

When the television receiver is used as an AV center to which other AV devices such as VTRs are connected, the AV devices are connected by an external bus, such as a D2B bus so that the respective systems can be controlled individually. To this end, each AV device incorporates a circuit shown in FIG. 16, for example.

Specifically, each AV device includes two sockets (11), (12) to connect it to the D2B bus. The socket (11) includes terminals (11a), (11b) and (11c) connected to balancing signal lines (13), (14) and a ground line (15). Similarly, the socket (12) also includes terminals (12a), (12b) and (12c) connected to the balancing signal lines (13), (14) and the ground line (15).

A current control circuit (19) of a D2BIC (24) is connected between a predetermined voltage source and the balancing signal line (13) and outputs a positive balancing signal to the balancing signal line (13) under the control of a control unit (23) via a transmission and reception buffer (22). A current control circuit (20) is connected between the balancing signal line (14) and a ground potential. The current control circuit (20) outputs a negative balancing signal to the balancing signal line (14) under the control of the control unit (23). A comparing circuit (21) detects the positive and negative balancing signals supplied to the balancing signal lines (13) and (14) and outputs a detected result through the transmission and reception buffer (22) to the control unit (23). The control unit (23) of the D2BIC (24) is connected to a CPU (25) which controls operations of the AV devices.

A resistor (16) is connected between the balancing signal lines (13) and (14) through a switch (17) or (18). The switch (17) is constantly set in its on state and turned off when a plug of the D2B bus (2) is connected to the socket (11). The switch (18) also is constantly set in its on state and turned off when the plug is connected to the socket (12).

FIG. 17 shows the connected state of an AV center (e.g., television receiver) (31) and a VTR (32) as the system. In this example, the terminals (11a) through (11c) of the socket (11) of the AV center (31) are connected through the D2B bus (2) to the terminals (11a) through (11c) of the socket (11) of the VTR (32).

In the example of FIG. 17, the D2B bus (2) is connected to the socket (11) of the AV center (31) and therefore the switch (17) of the AV center (31) is turned off. The D2B bus (2) is not connected to the socket (12) and therefore the switch (18) remains turned on.

Similarly, also in the VTR (32) side, while the D2B bus (2) is connected to the socket (11) so that the switch 17 is turned off, the D2B bus (2) is not connected to the socket (12) so that the switch (18) remains turned on.

Specifically, in this example, the resistor (16) of the AV center (31) is connected in the connection path composed of the terminal (11a) of the socket (11), the D2B bus (2), the terminal (11a) of the socket (11) of the VTR (32), the resistor (16), the switch (18), the terminal (11b) of the socket (11), the D2B bus (2), the terminal (11b) of the socket (11) of the AV center (31) and the switch (18).

FIG. 18 shows the state that the VTR (32) is connected to the AV center (31) to which a VTR (33) is further connected. Specifically, in this example, the VTR (32) is connected to the AV center (31) similarly to FIG. 17 and the terminals (12a) through (12c) of the socket (12) of the AV center (31) are connected through the D2B bus (2) to the terminals (12a) to (12c) of the socket (12) of the VTR (33).

Accordingly, in the case of this example, the switches (17) and (18) of the AV center (31) are both turned off. In the VTR (32), the switch (17) is turned off and the switch (18) is turned on similarly to FIG. 17. Further, in the VTR (33), the D2B bus (2) is not connected to the socket (11) and therefore the switch (17) is turned on. The D2B bus (2) is connected to the socket (12) and therefore the switch (18) is turned off.

Accordingly, in the case of this example, a connection path is composed of the resistor (16) of the VTR (32), the terminal (11a) of the socket (11), the D2B bus (2), the terminal (11a) of the socket (11) of the AV center (31), the terminal (12a) of the socket (12), the D2B bus (2), the terminal (12a) of the socket (12) of the VTR (33), the resistor (16), the switch (17), the terminal (12b) of the socket (12), the D2B bus (2), the terminal (12b) of the socket (12) of the AV center (31), the terminal (11b) of the socket (11), the D2B bus (2), the terminal (11b) of the socket (11) of the VTR (32) and the switch (18).

FIG. 19 shows the state that the VTR (32) is connected to the AV center (31) and that the VTR (33) is further connected to the VTR (32). The VTR (32) is connected to the AV center (31) similarly to FIG. 17. The terminals (12a) to (12c) of the socket (12) of the VTR (33) are respectively connected through the D2B bus (2) to the terminals (12a) to (12c) of the socket (12) of the VTR (32).

Accordingly, in the case of this example, in the AV center (31), the switch (17) is turned off and the switch (18) is turned on. In the VTR (32), the switches (17) and (18) are both turned off. Further, in the VTR (33), the switch (17) is turned on and the switch (18) is turned off.

As a result, in the case of this example, the connection path is composed of the resistor (16) of the AV center (31), the terminal (11a) of the socket (11), the D2B bus (2), the terminal (11a) of the socket (11) of the VTR (32), the terminal (12a) of the socket (12), the D2B bus (2), the terminal (12a) of the socket (12) of the VTR (33), the resistor (16), the switch (17), the terminal (12b) of the socket (12), the D2B bus (2), the terminal (12b) of the socket (12) of the VTR (32), the terminal (11b) of the socket (11), the D2B bus (2), the terminal (11b) of the socket (11) of the AV center (31) and the switch (18).

As described above, in the case of any examples, as shown in FIG. 20, the resistors (16) of the two AV devices (AV center (31) and VTR (32) in the case of the example of FIG. 17, VTR (32) and VTR (33) in the case of the example of FIG. 18, and AV center (31) and VTR (33) in the case of the example of FIG. 19) having end portions connected to the D2B bus (2) are connected in parallel to each other.

In this state, when a predetermined AV device outputs a predetermined command signal (including a request signal and the like) through the D2B bus (2) to another AV device, the CPU (25) outputs a signal corresponding to the command signal to the control unit (23). At that time, the control unit (23) controls the current control circuits (19) and (20) through the transmission and reception buffer (22) so that the current control circuits output balancing signals $PS_1$ and $PS_2$ of opposite polarity shown in FIG. 21 to the balancing signal lines (13) and (14), respectively. The balancing signals are supplied to the VTRs (32), (33) through the D2B bus (2) from the AV center (31), for example.

In the VTR (32) or VTR (33), the comparing circuit (21) compares magnitudes of voltages of the balancing signals $PS_1$, $PS_2$ supplied to the balancing signal lines (13) and (14). The comparing circuit (21) outputs data of logic level 0 when the levels of the two balancing signals are nearly equal. The comparing circuit outputs data of logic level 1 when the levels are larger than a previously-set predetermined reference value. The control unit (23) reads data (logic level) output from the comparing circuit (21) through the transmission and reception buffer (22) and outputs the data thus read to the CPU (25). The CPU (25) outputs a control signal corresponding to the read-out result to respective portions.

However, in the prior art, if the jig is connected to the internal bus, then it is frequently observed that an added impedance is present making the operation of the device unstable. Moreover, in order to maintain a stable performance, it is not preferable that the internal bus be placed around the outside. Furthermore, when the device is inspected after a rear cover thereof is attached to the device body, it is difficult to inspect the device by using the internal bus.

When AV devices are controlled through the D2B bus (2) connected thereto, it is frequently observed that the D2B bus (2) is connected in a wrong manner.

FIG. 22 shows the case that, when the AV center (31) and the VTR (32) are connected through the D2B bus (2) as shown in FIG. 17, not only the sockets (11) are connected together but also the sockets (12) also are connected through the D2B bus (2) by mistake.

Further, FIG. 23 shows the case that, when the VTR (32) and the VTR (33) are connected to the AV center (31) through the D2B bus (2) as shown in FIG. 18, such connection is made and then the socket (12) of the VTR (32) and the socket (11) of the VTR (33) are connected through the D2B bus (2) by mistake.

Furthermore, FIG. 24 shows the case that, when the VTR (32) is connected to the AV center (31) and the VTR (33) is connected to the VTR (32) as shown in FIG. 19, the VTR (33) is connected to the AV center (31) by mistake.

If the erroneous connection is made as described above, then the two resistors (16) are not connected between the balancing signal lines (13) and as shown in FIG. 20. In the example of FIG. 22, for example, the switches (17) and (18) are both turned off in the AV center (31) and the VTR (32) so that the resistor (16) is not connected between the balancing signal lines (13) and (14).

Also in the example of FIG. 23, the switches (17) and (18) are both turned off in all of the AV center (31), the VTR (32) and the VTR (33). Therefore, also in this case, the resistor (16) is not connected between the balancing signal lines (13) and (14). This is also true in FIG. 24.

In this state, since the two resistors (16) that should be connected are not connected, absolute values of the levels of the balancing signals supplied to the D2B bus (2) become abnormally larger than regular values. There is then the risk that the comparing circuit (21) cannot detect the command signal correctly.

DISCLOSURE OF INVENTION

In view of the aforesaid aspect, the present invention is to provide an electronic device in which an inspection and a state setting can be carried out without making the operation unstable even after a rear cover is attached to the electronic device, an inspection apparatus thereof and a state setting apparatus thereof.

Furthermore, the present invention is to provide an electronic device in which a D2B bus (2) can be prevented from being connected erroneously.

An electronic device inspection apparatus according to a first invention comprises a signal transmitter for transmitting a request signal to a bus-line of other device, a signal receiver for receiving a signal from a bus-line of other device and a state analyzing unit for analyzing a signal from the signal receiver, wherein the state analyzing unit identifies the state of other device on the basis of a signal obtained from the signal receiver. Thus, it is possible to identify the state of other device connected through the bus-line.

An electronic device state setting apparatus according to a second invention includes a signal transmitter for transmitting a signal to other device wherein the state of other device is set by the signal transmitted from the signal transmitter, thereby making it possible to set the state of other device connected through a bus.

An electronic device according to a third invention includes an external bus, a control unit for executing a process to receive a signal from the external bus and a memory unit for storing a content of a signal, wherein the control unit stores information corresponding to the received signal in the memory unit when it is determined by the control unit that the received signal is a state setting signal. Thus, the state of the electronic device is set by a state setting apparatus connected through a bus.

According to a fourth invention, the electronic device according to the third invention includes the memory unit which is composed of a nonvolatile memory. Thus, the set state is stored and maintained.

An electronic device state setting system according to a fifth invention includes an electronic device state setting apparatus including a signal transmitter for transmitting a signal to a bus-line of other device to thereby set the state of other device by the signal transmitted from the signal transmitter, an external bus, a control unit for executing a process to receive a signal from the external bus, and a memory unit for storing a content of a signal and in which the control unit stores information corresponding to a received signal in the memory unit when it is determined by the control unit that the received signal is a state setting signal. Thus, there is arranged the system in which the state of the electronic device connected through the bus-line can be set by the setting apparatus.

According to a sixth invention, the system according to the fifth invention includes the bus-line which is formed of a serial bus. Thus, the state of the device can be set by serial communication.

An electronic device according to a seventh invention includes an external bus, a means for detecting an amplitude of a signal of the external bus, and an warning information generating means in which the warning information generating means generates warning information when the amplitude lies out of a predetermined range, thereby making it possible to generate warning information depending on the state of the external bus.

According to an eighth invention, the electronic device according to the seventh invention includes the bus-line which is formed of a serial bus and in which a signal is detected by a transmission signal line. Thus, the transmission signal line can be detected.

According to a ninth invention, the electronic device according to the seventh invention includes the bus-line which is formed of a serial bus and in which a signal is detected by a reception signal line. Thus, the reception signal line can be detected.

According to a tenth invention, there is provided the electronic device according to the eighth invention in which the warning information is generated by comparing a reference voltage and a bus-line voltage. Thus, accurate warning information can be generated.

According to an eleventh invention, there is provided the electronic device according to the ninth invention in which the warning information is generated by comparing a reference voltage and a bus-line voltage. Thus, accurate warning information can be generated.

According to a twelfth invention, there is provided the electronic device according to the tenth invention in which warning information is generated after compared result was integrated. Thus, warning information can be generated by a trend of a bus-line voltage.

According to a thirteenth invention, there is provided the electronic device according to the eleventh invention in which warning information is generated after compared result was integrated. Thus, warning information can be generated by a trend of a bus-line voltage.

According to a fourteenth invention, there is provided the electronic device according to the seventh invention which includes a display device to display warning information when the warning information is generated. Thus, the user can be warned.

According to a fifteenth invention, there is provided the electronic device according to the fourteenth invention in which a display of warning information is stopped when an amplitude of a signal that was detected again after warning information had been generated falls within a predetermined range. Thus, the user can be warned only when necessary.

According to a sixteenth invention, there is provided the electronic device according to the seventh invention in which first and second reference voltages are provided in order to determine a predetermined range of an amplitude and in which the amplitude falls within the predetermined range when a signal voltage is lower than the first reference voltage and higher than the second reference voltage.

According to a seventeenth invention, there is provided the electronic device according to the tenth invention in which the bus-line voltage is compared with the reference voltage after it was integrated. Thus, warning information can be generated by a trend of the bus-line voltage.

According to an eighteenth invention, there is provided the electronic device according to the eleventh invention in which the bus-line voltage is compared with the reference voltage after it was integrated. Thus, warning information can be generated by a trend of the bus-line voltage.

According to a nineteenth invention, there is provided an electronic device which comprises an external bus, a means for detecting an amplitude of a signal of the external bus, a terminating resistor and a control unit for controlling a connection of the terminating resistor to the bus-line and in which the control unit connects the terminating resistor to the bus-line when the detected amplitude of the signal lies out of a predetermined range. Thus, the connection of the terminating resistor to the bus-line can be controlled satisfactorily.

According to a twentieth invention, there is provided the electronic device according to the seventh invention which includes a terminating resistor and a control unit for controlling a connection of the terminating resistor to the bus-line and in which the control unit connects the terminating resistor to the bus-line when the warning information is generated. Thus, the connection of the terminating resistor to the bus-line can be controlled satisfactorily.

According to a twenty first invention, there is provided the electronic device according to the twentieth invention which includes a display device to display warning information when the warning information is generated and in which the terminating resistor is connected to the bus-line after the warning information is displayed. Thus, the terminating resistor is connected to the bus-line when a warning is displayed.

According to a twenty second invention, there is provided the electronic device according to the twenty first invention in which a display of warning is stopped when an amplitude of a signal that was detected again after the terminating resistor had been connected falls within a predetermined range. Thus, the warning can be displayed and stopped satisfactorily.

BEST MODE FOR CARRYING OUT THE INVENTION

Figure 1:
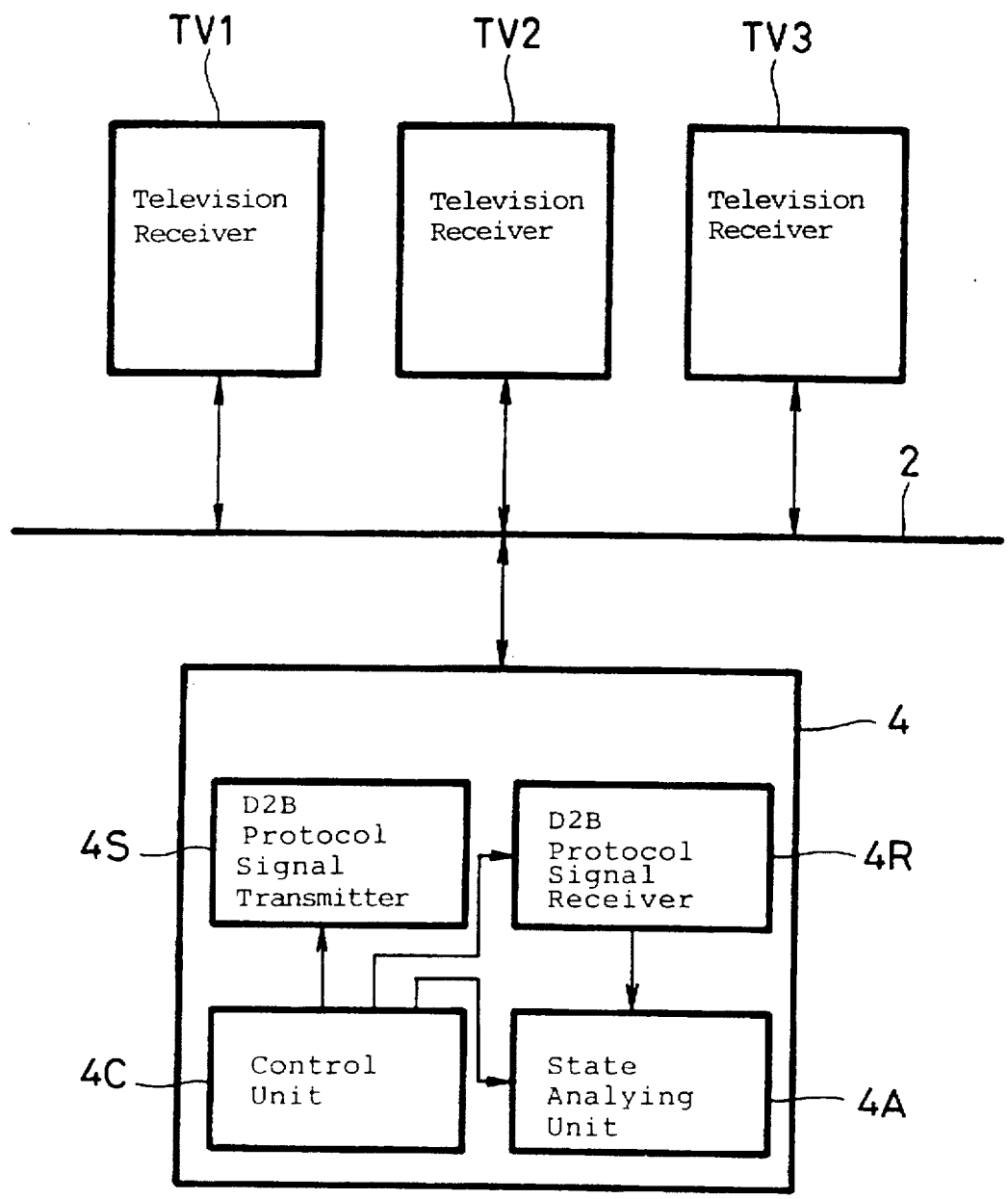
FIG. 1 is a block diagram showing an arrangement of an electronic device system according to an embodiment of the present invention.

FIG. 1 shows an arrangement of an electronic device inspection system according to an embodiment of the present invention. Three television receivers (TV1), (TV2) and (TV3) are connected through a D2B bus (2) serving as an external bus to an inspection jig (4). The television receivers (TV1) (TV2) and (TV3) include D2B control signal terminals disposed near AV terminals provided on the rear covers thereof.

The inspection jig (4) includes a D2B protocol signal transmitter (4S) for transmitting an inspection command composed of a combination of an ordinary D2B command and an inquiry (i.e., request) command or a command exclusively-used by the jig, which is a state setting command, through the D2B bus (2) to the television receiver (TV1), (TV2) or (TV3) in accordance with a D2B bus format, a D2B protocol signal receiver (4R) for receiving an answer in D2B format transmitted thereto from the television receiver (TV1), (TV2) or (TV3) through the D2B bus (2), a state analyzing unit (4A) for determining on the basis of the answer received by the receiver (4R) whether the state of the television receiver (TV1), (TV2) or (TV3) which transmits the answer is normal or abnormal, and a control unit (4C) for controlling the D2B protocol signal transmitter (4S), the D2B protocol signal transmitter (4R) and the state analyzing unit (4A).

Figure 2:
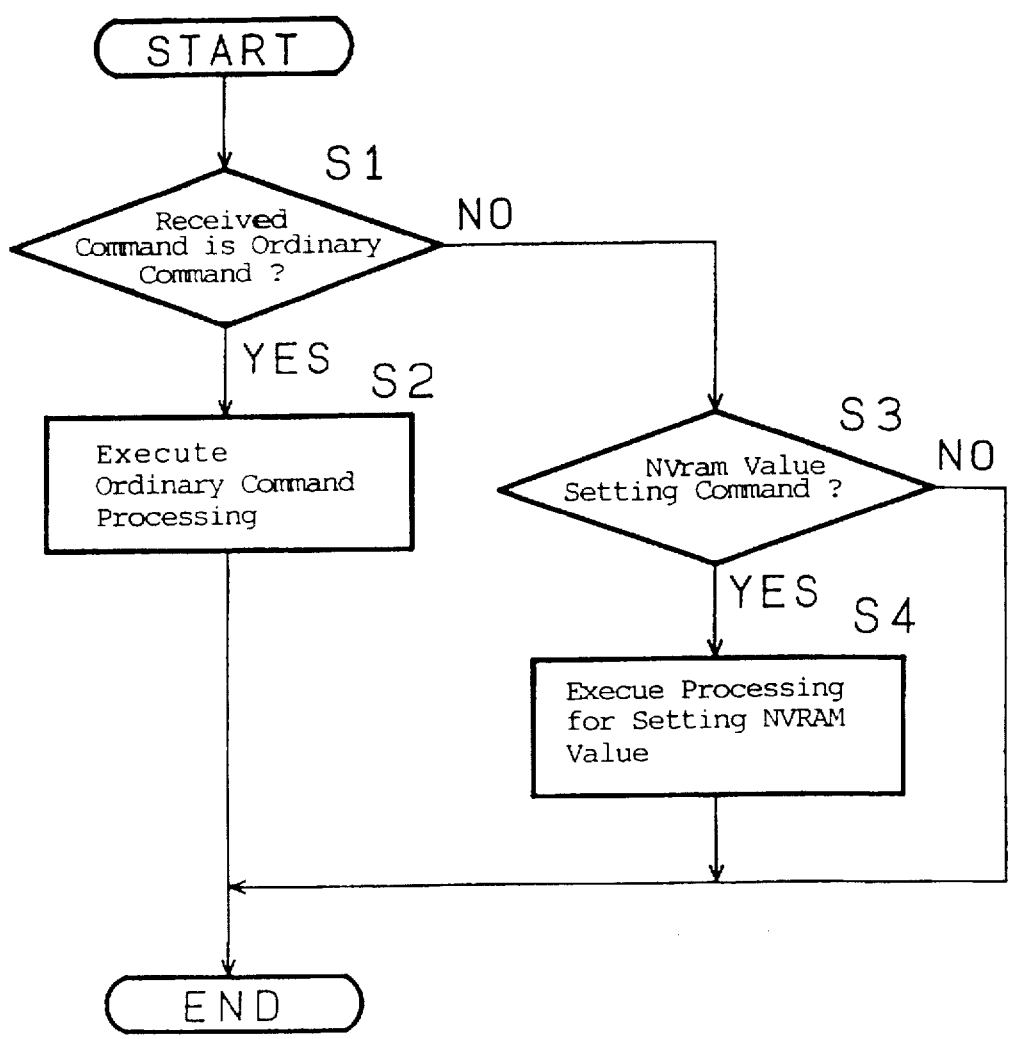
FIG. 2 is a flowchart showing an example of an operation of a television receiver in the embodiment of FIG. 1.

FIG. 2 shows an example of an operation of the television receiver in the embodiment shown in FIG. 1. Initially, the D2B protocol signal transmitter (4S) of the inspection jig (4) addresses the television receiver (TV1), for example, and transmits the D2B command to that television receiver. A D2B processing microcomputer of the television receiver (TV1) which received the D2B command determines whether the received command is the ordinary command or the command exclusively-used by jig (step S1). If the received command is the ordinary command, then a corresponding processing is executed and an answer indicating the processed result is transmitted to the inspection jig (4) (step S2). The D2B protocol receiver (4R) of the inspection jig (4) receives such answer and transmits the same to the state analyzing unit (4A). The state analyzing unit (4A) analyzes the answer to determine whether the state of the television receiver (TV1) is normal or abnormal.

If the D2B processing microcomputer of the television receiver (TV1) determines that the received command is the command exclusively-used by jig, i.e., the state setting command (NO in step S1), then it determines whether or not that command is an NVRAM (nonvolatile RAM) value setting command (step S3). If so, then a destination setting value, a specification setting value, a channel setting value or various initial values are set in the NVRAM (step S4).

Thereafter, the D2B protocol signal transmitter (4S) of the inspection jig (4) inquires the television receiver (TV1) whether the state setting to the NVRAM is correctly carried out. The D2B protocol receiver (4R) of the inspection jig (4) receives an answer from the television receiver (TV1). The state analyzing unit (4A) analyzes this answer to determine whether or not the state setting is carried out correctly.

In the above-mentioned embodiment, since the state of the television receiver is checked and the state is set by using the external AV bus called D2B bus, under the condition that the rear cover of the device is attached to the device body, the inside state can be checked and the state can be set.

Since the D2B bus is of the external bus specification, even when various inspection devices such as the inspection jig are connected thereto, there is then no risk that the operation becomes unstable.

Further, since the inspection command is composed of a combination of the ordinary D2B command and the request command, a special inspection software need not be made unlike the prior art. Also, since the external jig is served as the inspection software, it is possible to reduce a burden of testing software inside a television receiver.

Although details such as IC of each television receiver cannot be checked in the D2B protocol specification, the D2B protocol specification is standardized. Therefore, once the inspection software on the inspection jig side is made, the inside of any television receiver can be inspected by the same inspection jig so long as a television receiver is a television receiver conforming to the D2B.

The above-mentioned embodiment can be applied not only to the inspection on the production line but also applied to the inspection upon maintenance service. Moreover, a defective portion can be checked even at the shop-front by the inspection jig. Furthermore, if the inspection jig incorporates a MODEM, then it is possible to check a defective portion or to set an initial value even from a distant place.

While the three television receivers are connected to the D2B bus (2) as described above, according to the D2B protocol, eight AV devices of the same kind can be connected to the D2B bus at maximum. Thus, eight television receivers can be connected to the D2B bus (2).

While the television receiver is the inspected object as described above, the present invention is not limited to the inspection of the television receiver and can be applied to the inspection of other AV devices, such as VTR (video tape recorder) and LDP (video disc player).

While the television receivers and the inspection jig are connected through the D2B bus as described above, they can be connected through other external AV bus.

Figure 3:
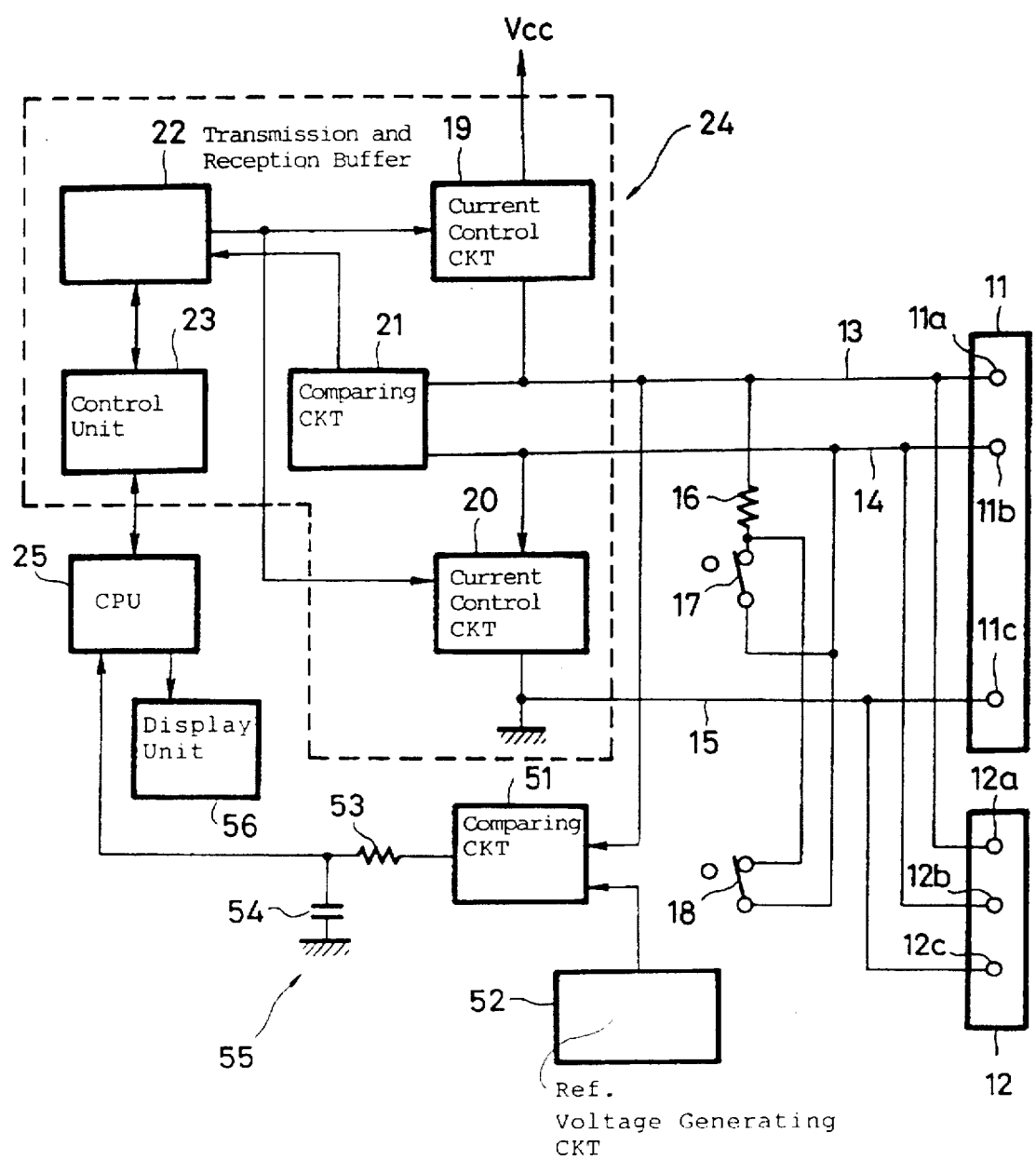
FIG. 3 is a block diagram showing an example of an arrangement of a circuit housed in the electronic device of the electronic device system according to the present invention.

A system that can inspect the erroneous connection of AV device connected through an external bus will be described below. FIG. 3 shows an example of an arrangement of a circuit housed in the AV devices used in such system, i.e., AV device functioning as at least the AV center, such as a television receiver.

Figure 16:
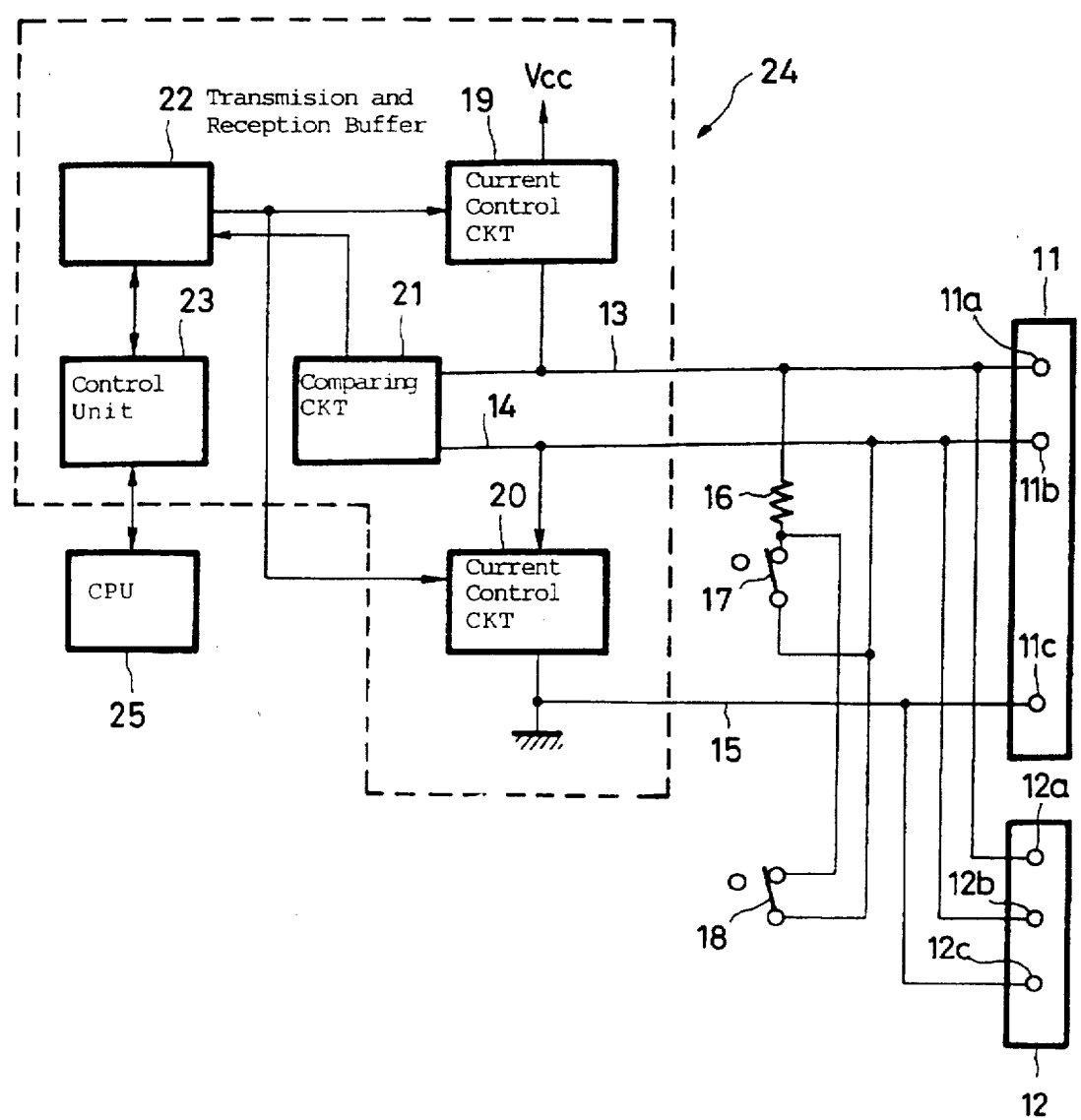
FIG. 16 is a block diagram showing an example of an arrangement of a circuit included in a conventional electronic device system.
Figure 17:
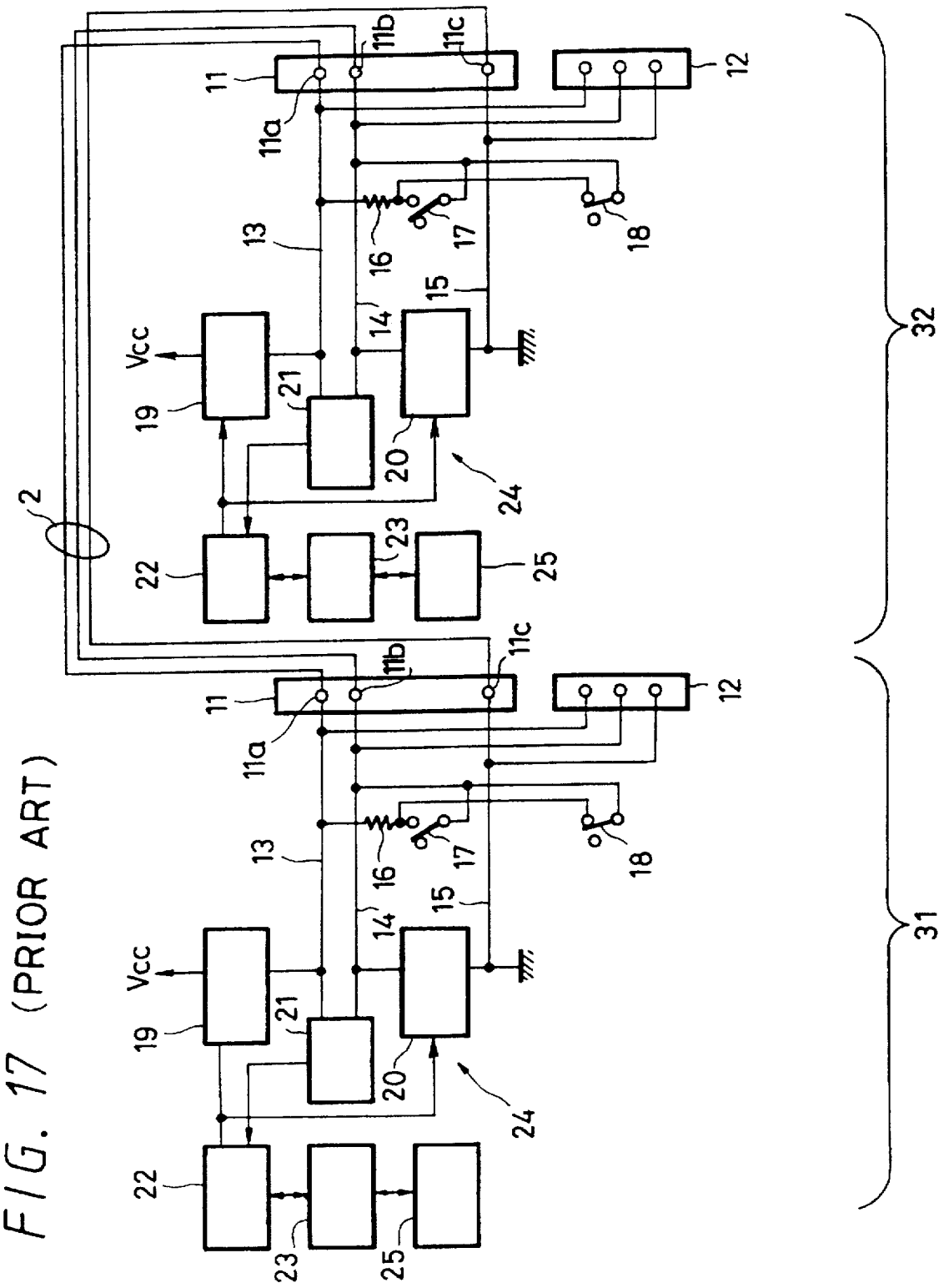
FIG. 17 is a block diagram showing a connection example of an electronic device system housing the circuit shown in FIG. 16.
Figure 18:
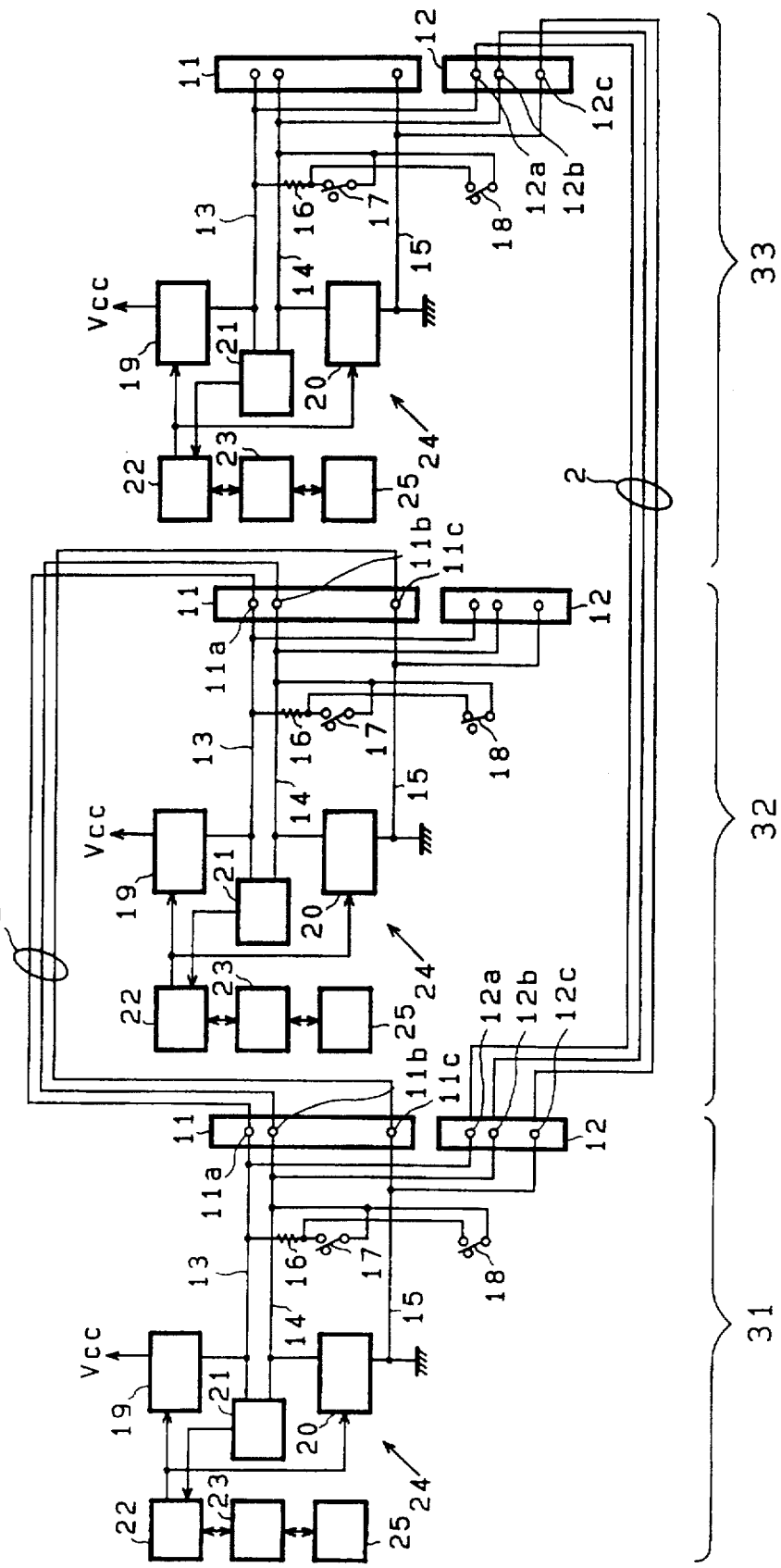
FIG. 18 is a block diagram showing other connection example of the electronic device system housing the circuit shown in FIG. 16.

A fundamental arrangement is similar to that of the example shown in FIG. 16. In this embodiment, the balancing signal line (13) is connected to a comparing circuit (51). A reference voltage output from a reference voltage generating circuit (52) is supplied to the comparing circuit (51). The comparing circuit (51) compares magnitudes of a voltage of the balancing signal line (13) and the reference voltage output from the reference voltage generating circuit (52). Then, the comparing circuit outputs a signal of high level, for example, when the voltage of the balancing signal line (13) is larger than the reference voltage and outputs a signal of low level when the voltage of the balancing signal line (13) is smaller than the reference voltage.

An output from the comparing circuit (51) is integrated by an integrating circuit (55) composed of a resistor (53) and a capacitor (54) and supplied to the CPU (25). The CPU (25) causes a display unit (56) to display a predetermined message in response to an output of the integrating circuit (55). As the display unit (56), there can be used a display such as CRT or LCD so long as the device that houses this circuit is a television receiver, for example. In addition, a lamp and a LED can be used as this display unit.

Figure 4:
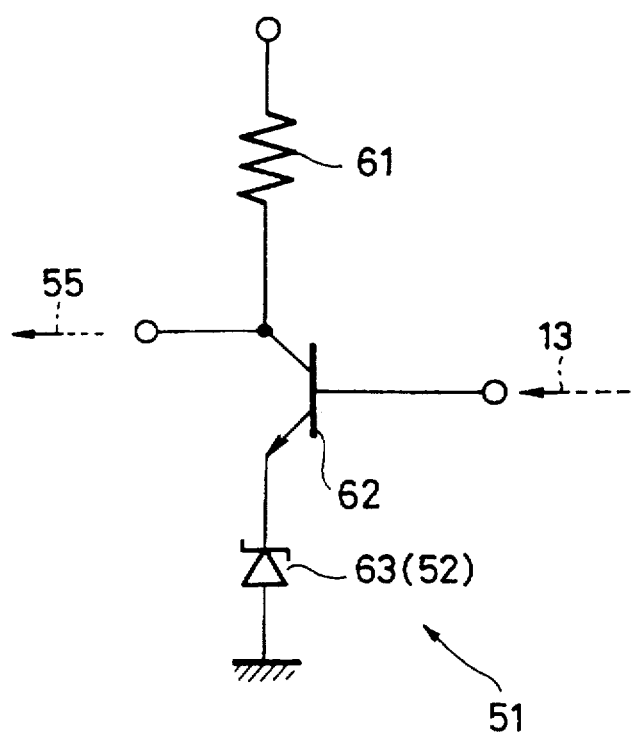
FIG. 4 is a circuit diagram showing an example of an arrangement of a comparing circuit (51) of FIG. 3.

FIG. 4 shows an example of an arrangement of the comparing circuit (51). An output voltage of the balancing signal line (13) is supplied to the base of an NPN transistor (62) which is supplied at its collector with a predetermined reference voltage through a resistor (61). The emitter of the NPN transistor (62) is grounded through a Zener diode (63) serving as the reference voltage generating circuit (52). A signal output from the collector of the NPN transistor (62) is supplied to the integrating circuit (55) of the succeeding stage.

Figure 5:
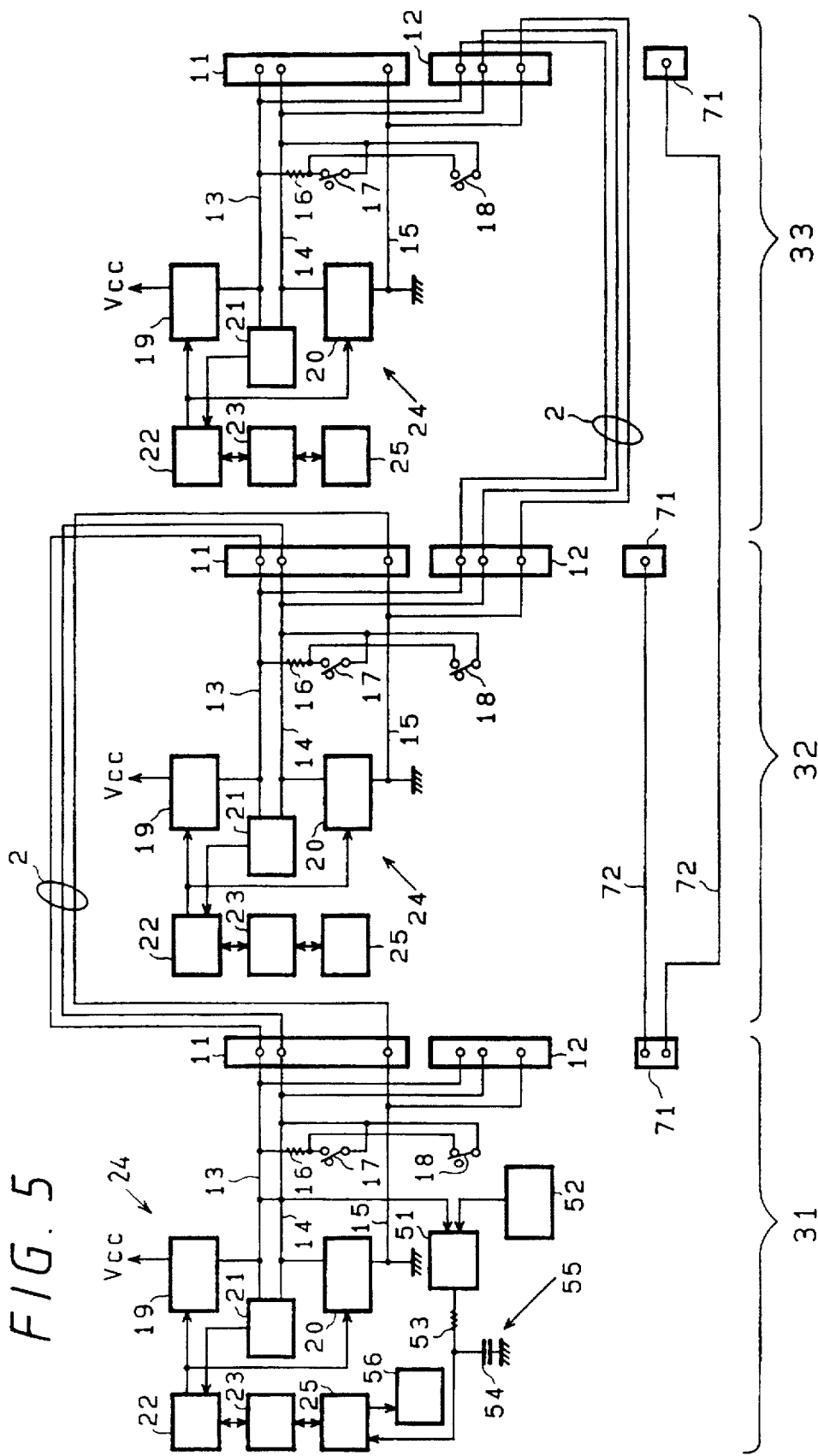
FIG. 5 is a block diagram showing an example of a connection of the electronic device system housing the circuit shown in FIG. 3.
Figure 19:
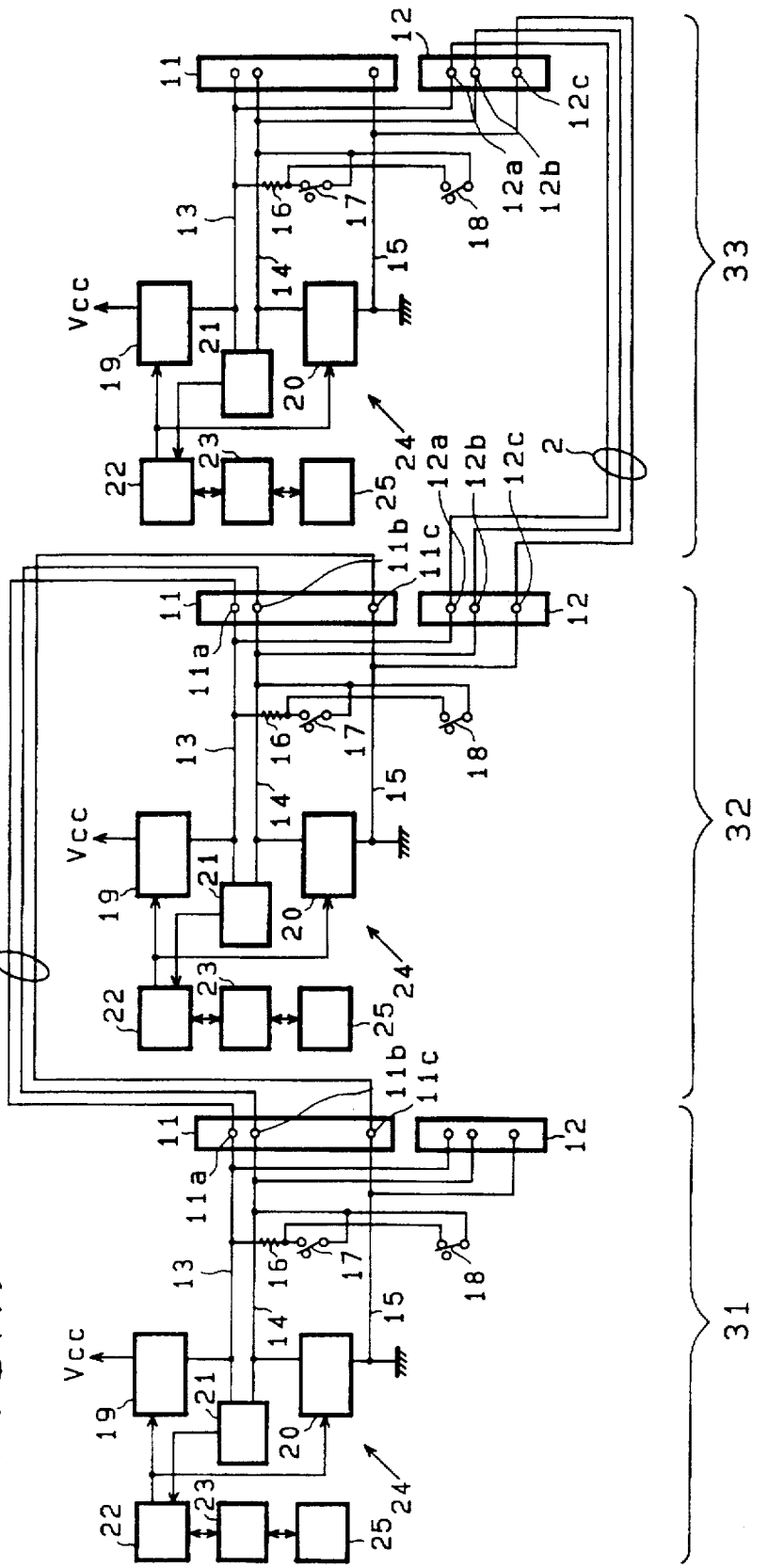
FIG. 19 is a block diagram showing a further connection example of the electronic device system housing the circuit shown in FIG. 16.

FIG. 5 shows an example of an arrangement of a system to which the AV device housing the circuit shown in FIG. 3 is connected. A fundamental connected state thereof is similar to that shown in FIG. 19.

Specifically, the socket (11) of the AV center (television receiver) (31) is connected through the D2B bus (2) to the socket (11) of the VTR (32). The socket (12) of the VTR (32) is connected through the D2B bus (2) to the socket (12) of the VTR (33).

One terminal of a socket (71) of the AV center (31) is connected to a terminal of the socket (71) of the VTR (32) through an AV signal line (72). Similarly, the other terminal of the socket (71) of the AV center (31) is connected through an AV signal line (72) to the terminal (71) of the VTR (33). Thus, the audio and video signals can be transmitted and received between the AV center (31) and the VTR (32) and between the AV center (31) and the VTR (33).

In this embodiment, the AV center (31) houses the circuit shown in FIG. 3. While the VTR (32) and the VTR (33) do not house the circuit shown in FIG. 3 as described above, they can house such circuit.

Figure 6:
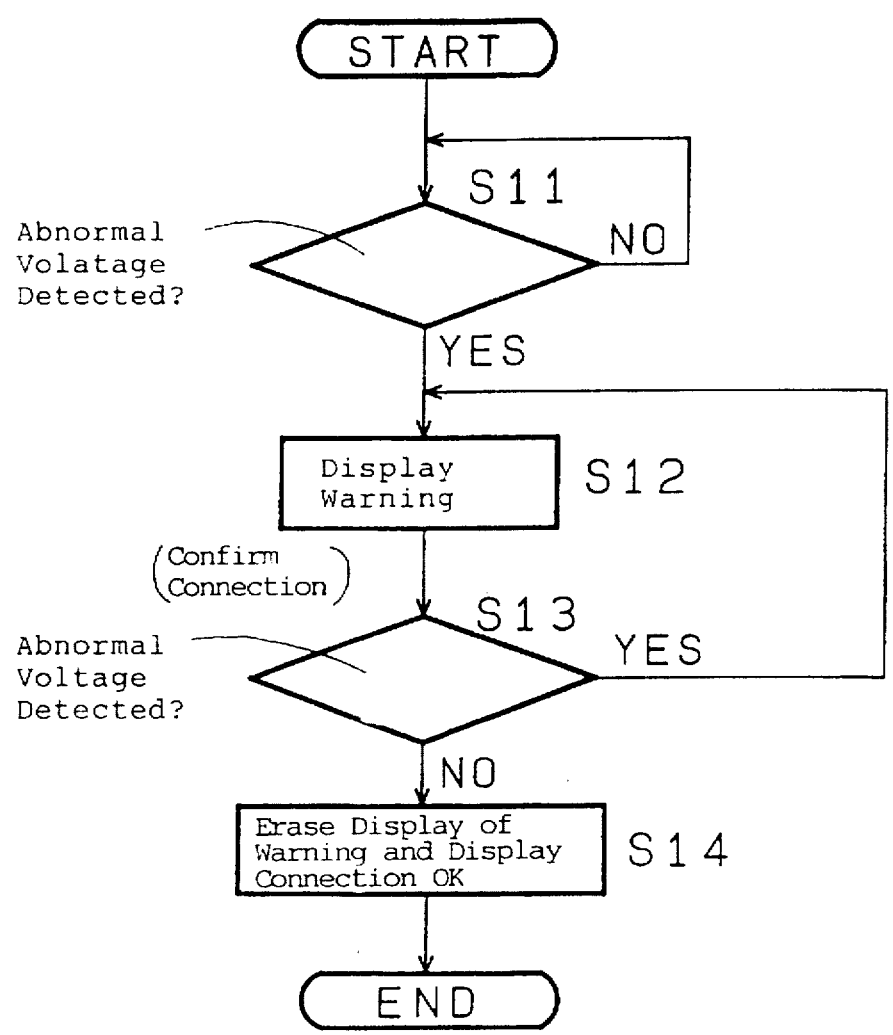
FIG. 6 is a flowchart used to explain an operation of the embodiment shown in FIG. 5.

An operation of the embodiment shown in FIG. 5 will be described with reference to a flowchart shown in FIG. 6. Initially, in step S11, the CPU (25) causes the comparing circuit (51) to monitor the output voltage of the balancing signal line (13) and determines whether or not an abnormal voltage is detected.

Specifically, when the CPU (25) outputs a predetermined command signal, it controls the current control circuits (19) and (20) through the control unit (23) and the transmission and reception buffer (22) to thereby supply currents of opposite polarities to the balancing signal lines (13) and (14). As a result, when the AV center (31), the VTR (32) and the VTR (33) are correctly connected through the D2B bus (2), balancing signals $PS_1$, $PS_2$ shown in FIG. 7 are supplied through the D2B bus (2) to the VTR (32) and the VTR (33).

Specifically, the output voltage of the balancing signal line (13) is set to 2.5V, for example, when the comparing circuit outputs data of logic level 0. The output voltage of such balancing signal line is set to a value larger than 2.5V by 0.2V, i.e., 2.7V when the comparing circuit outputs data of logic level 1. Similarly, the output voltage of the balancing signal line (14) is set to 2.5V when the comparing circuit outputs data of logic level 0. The output voltage of such balancing signal line is set to a value smaller than 2.5V by 0.2V, i.e., 2.3V when the comparing circuit outputs data of logic level 1.

The comparing circuits (21) of the VTRs (32),(33) compare the voltages of the balancing signals $PS_1$, $PS_2$ supplied thereto through the D2B bus (2). Then, the comparing circuits judge and output data of logic 0 when a difference therebetween is 0 (or smaller than a predetermined reference value (e.g., 0.02V)). When the difference therebetween is larger than the reference value (0.12V), the comparing circuits judge and output data of logic level 1. The CPU (25) decodes logic data supplied thereto from the comparing circuit (21) through the transmission and reception buffer (22) and the control unit (23) and executes a processing corresponding to a command expressed by such logic data.

Figure 7:
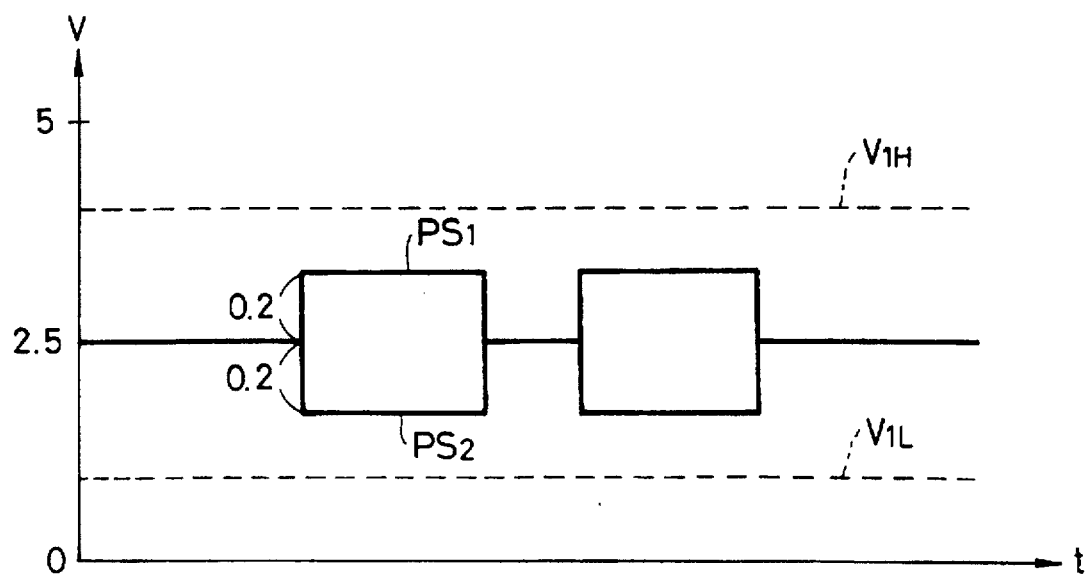
FIG. 7 is a waveform diagram used to explain an operation of the comparing circuit (51) of FIG. 3 under the correct connected state.

A reference voltage $V_{1H}$ output from the reference voltage generating circuit (52) (Zener diode (63)) is set to a value larger than a voltage (2.7V) expressing the data of logic level 1 of the balancing signal line (13) as shown in FIG. 7. Accordingly, the comparing circuit (51) outputs a signal of low level, for example, at that time (when the D2B bus 2 is connected correctly).

Figure 9:
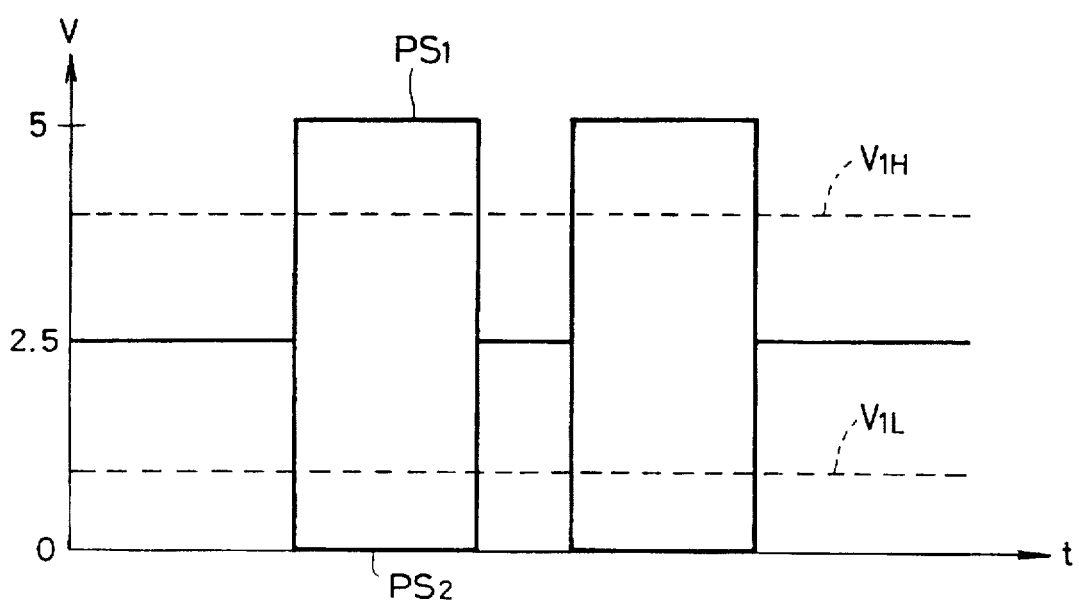
FIG. 9 is a waveform diagram used to explain an operation of the comparing circuit (51) of FIG. 3 under the erroneously connected state.
Figure 8:
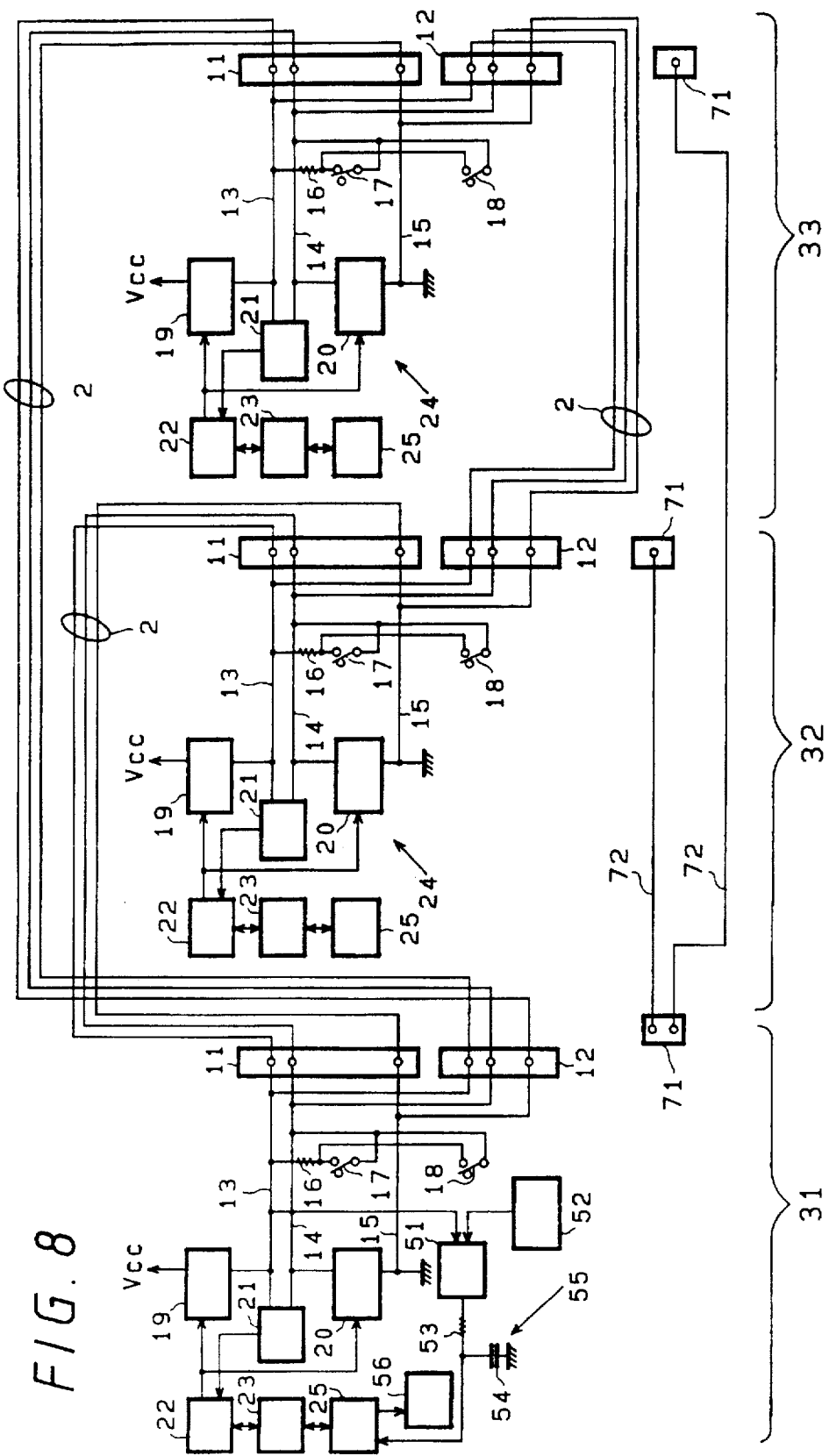
FIG. 8 is a block diagram showing the erroneously connected state.
Figure 20:
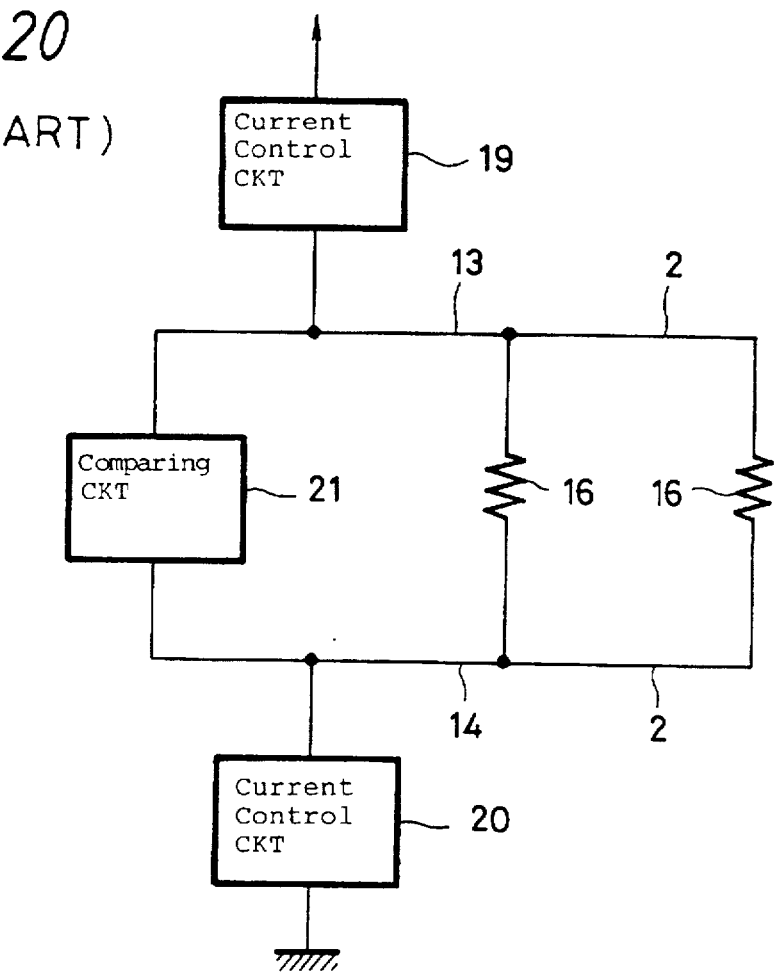
FIG. 20 is a diagram showing an equivalent circuit provided under the correct connected state.
Figure 21:
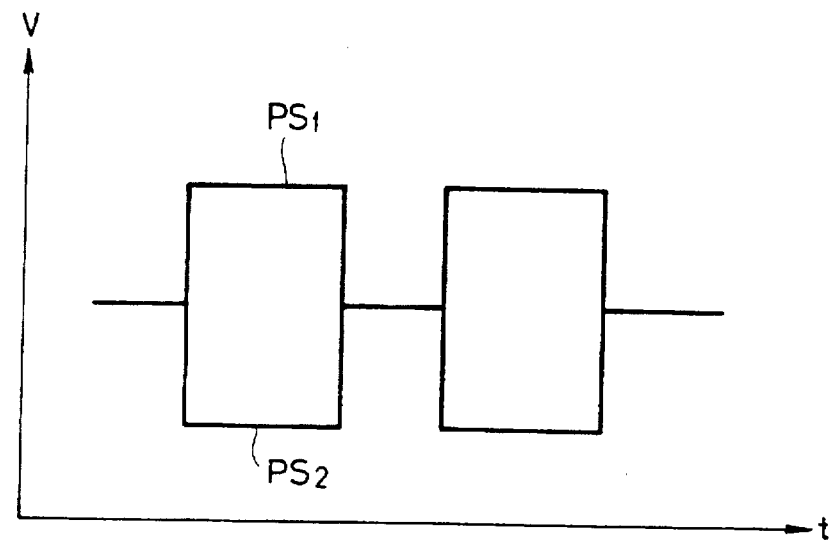
FIG. 21 is a diagram used to explain balancing signals output to balancing signal lines (13) and (14) in the circuit shown in FIG. 20.
Figure 22:
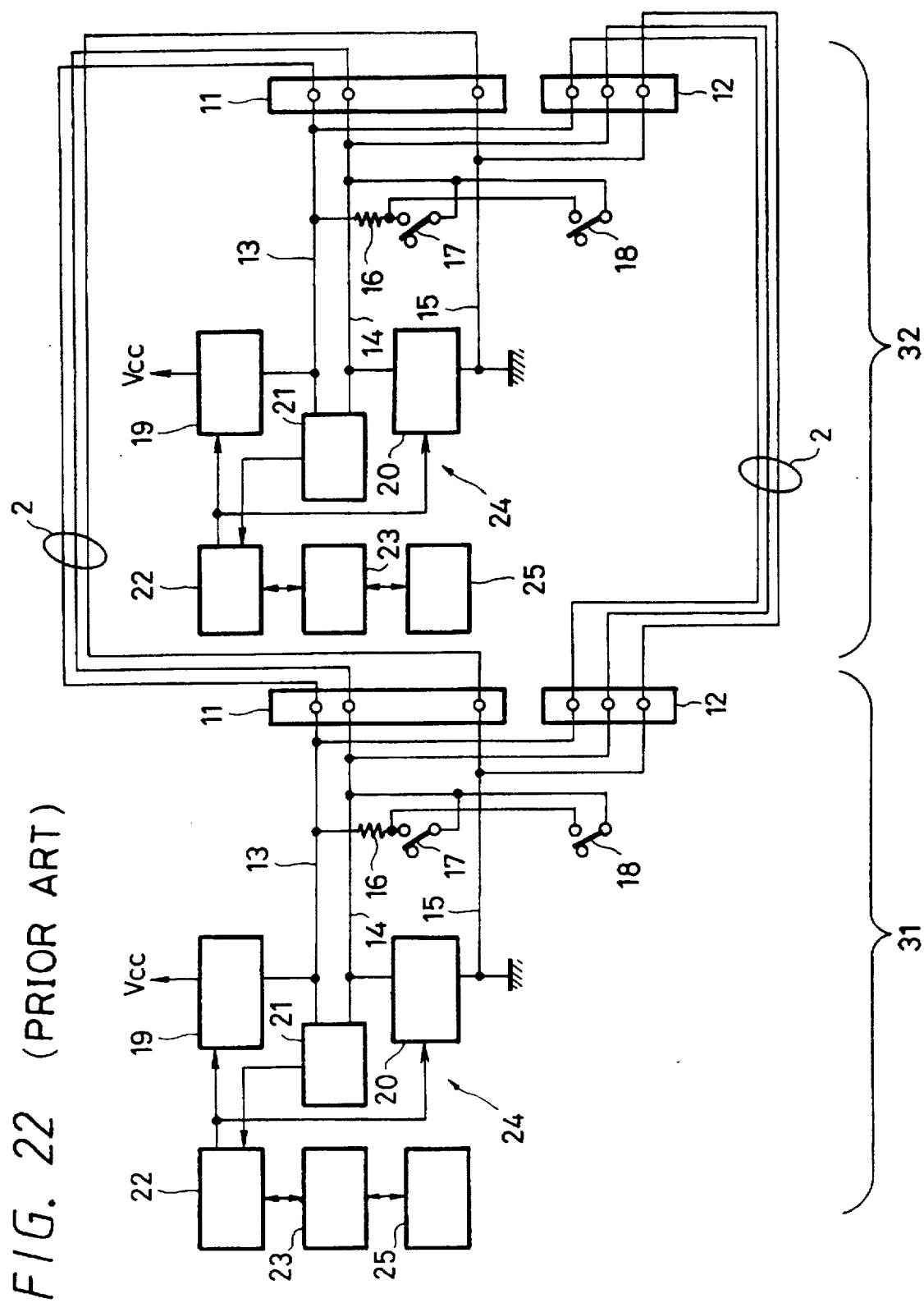
FIG. 22 is a block diagram showing an example of the erroneously connected state.
Figure 23:
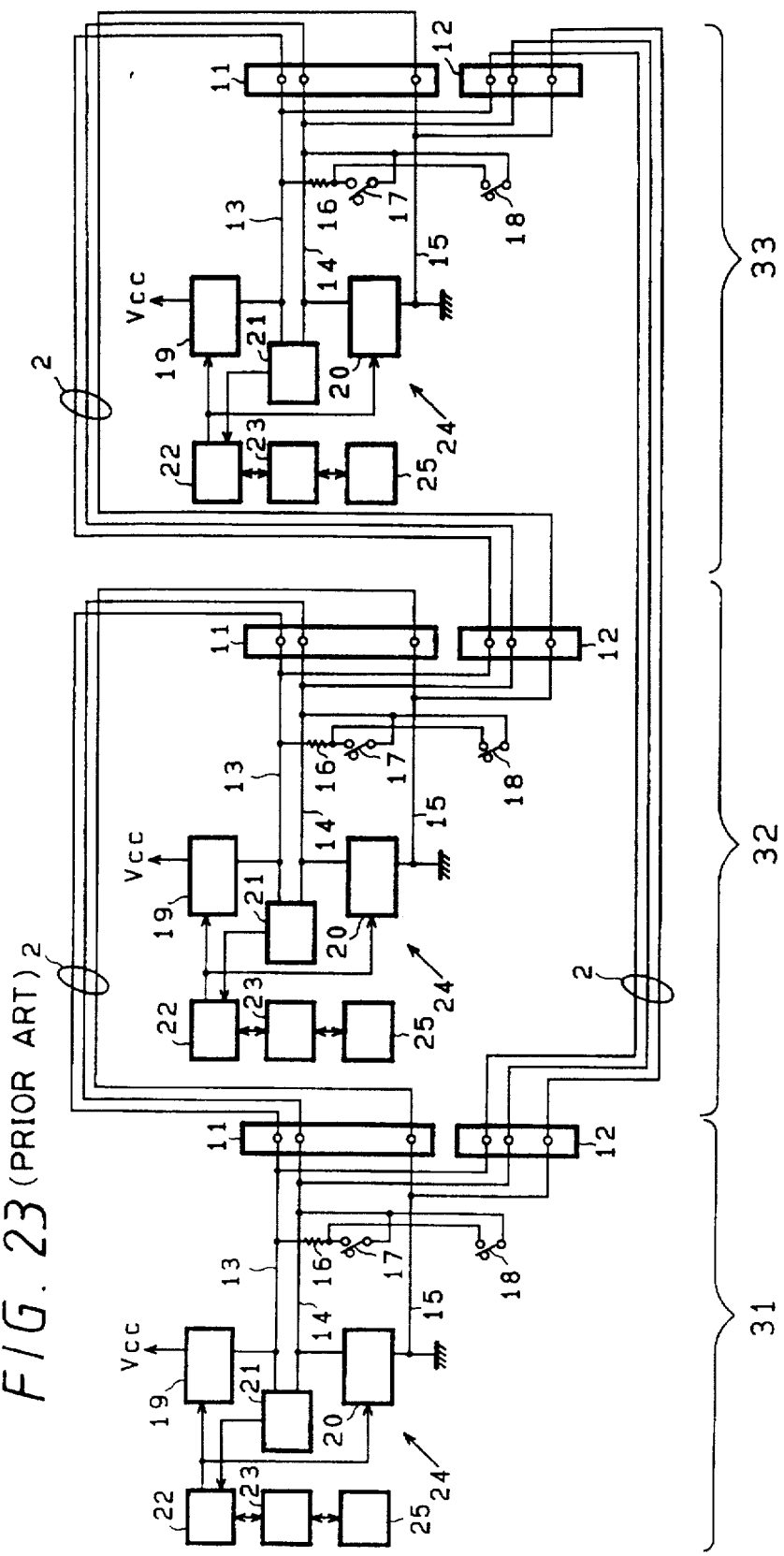
FIG. 23 is a block diagram showing other example of the erroneously connected state.
Figure 24:
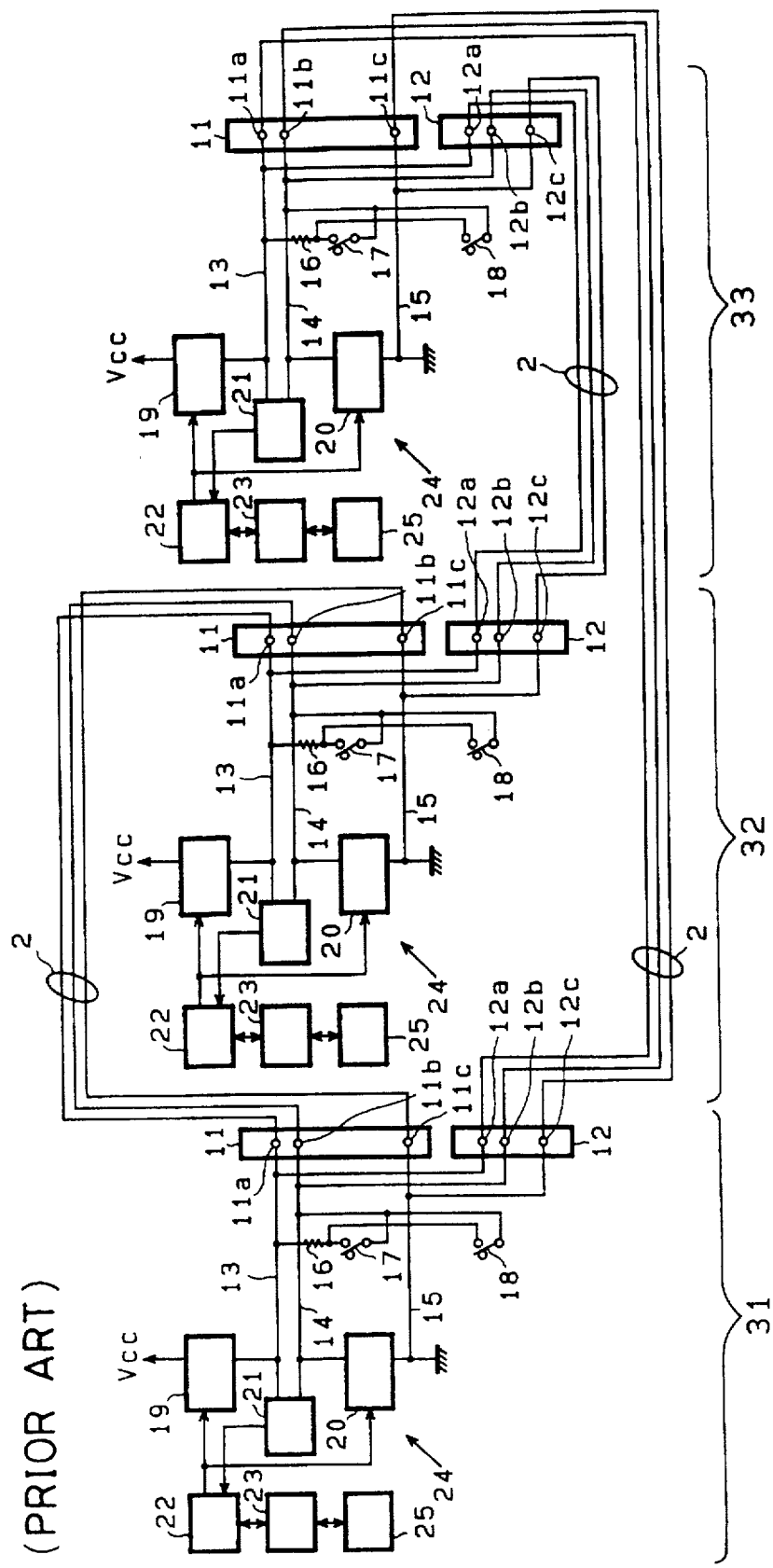
FIG. 24 is a block diagram showing a further example of the erroneously connected state.

On the other hand, when an erroneous connection is made as shown in FIG. 8, for example, the two resistors (16) shown in FIG. 20 are not connected between the balancing signal lines (13) and (14) so that the voltages of the balancing signal lines (13) and (14) become maximum voltages (5V in the case of this embodiment) or minimum voltages (0V in the case of this embodiment) as shown in FIG. 9.

The reference voltage $V_{1H}$ output from the reference voltage generating circuit (52) is set to a value smaller than this maximum voltage. Specifically, the reference voltage $V_{1H}$ is set to an intermediate value between the voltage in the logic level 1 shown in FIG. 7 and the voltage in the logic level 1 shown in FIG. 9. As a result, the comparing circuit (51) outputs a signal of high level at a timing in which the balancing signal of logic level 1 is output to the balancing signal line (13). This signal is integrated by an integrating circuit (55) and supplied to the CPU (25).

As described above, in step S11, if the integrating circuit (55) inputs the signal of high level, then the processing proceeds to step S12, whereat the CPU (25) causes the display unit (56) to display a predetermined warning. This warning might be a message such as "Connection of bus-line is abnormal".

Since such warning is displayed by the display unit (56), the user can confirm the connection of the D2B bus (2). If the connection is erroneous, then the user can start making the correct connection again.

Then, the processing proceeds to step S13, whereat it is determined whether or not the abnormal voltage is still detected. If the comparing circuit (55) still outputs the signal of high level, then the processing returns to step S12, whereat the display of warning is continued. If it is determined in step S13 that the output of the comparing circuit (51) is returned to the low level, then the processing proceeds to step S14, whereat the warning that was displayed in step S12 is erased but instead connection OK is displayed. Specifically, the CPU (25) controls the display unit (56) to display a message of "Connection of bus-line is OK", for example.

Figure 10:
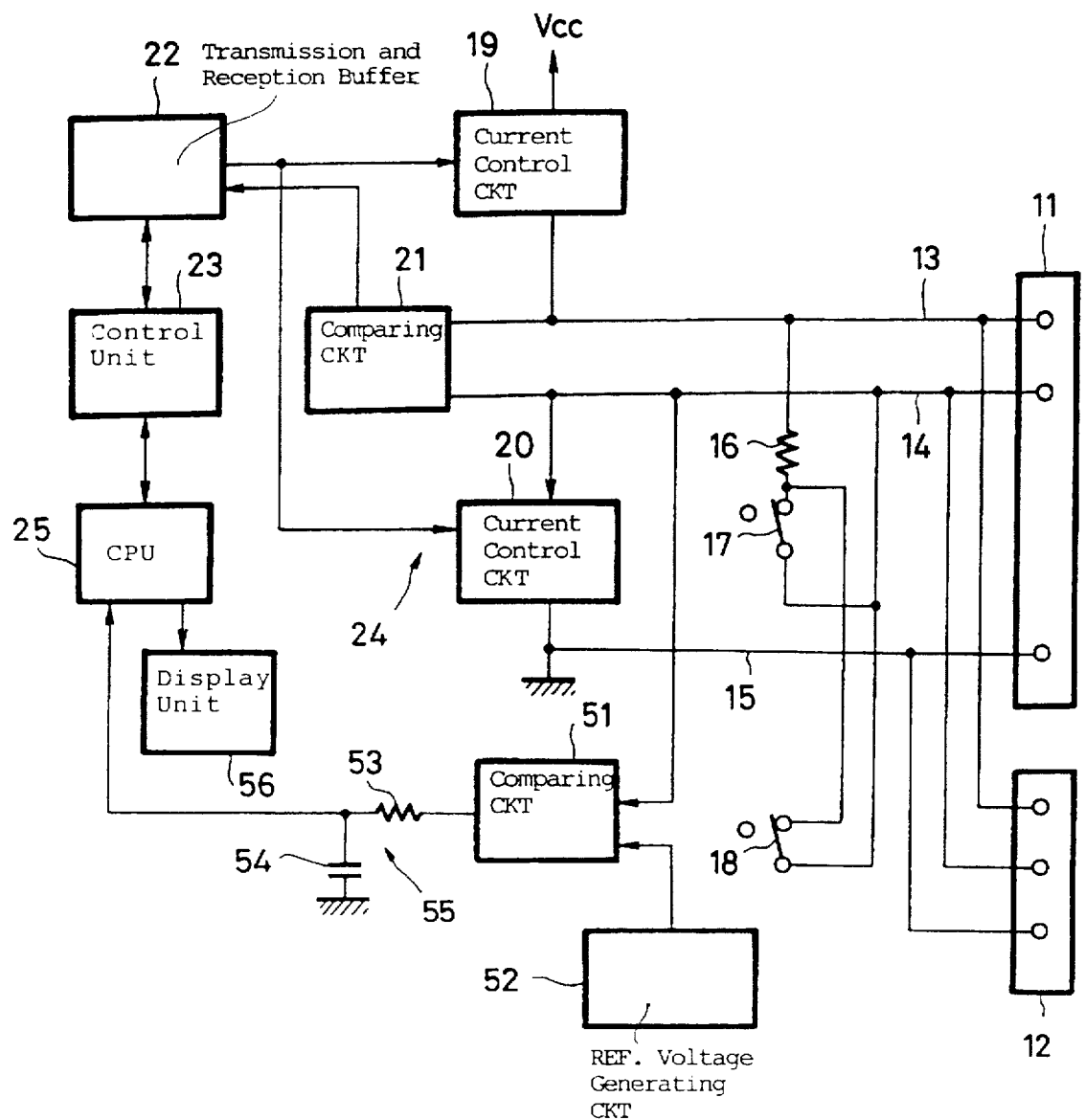
FIG. 10 is a block diagram showing other example of an arrangement of a circuit housed in the electronic device system according to the present invention.
Figure 11:
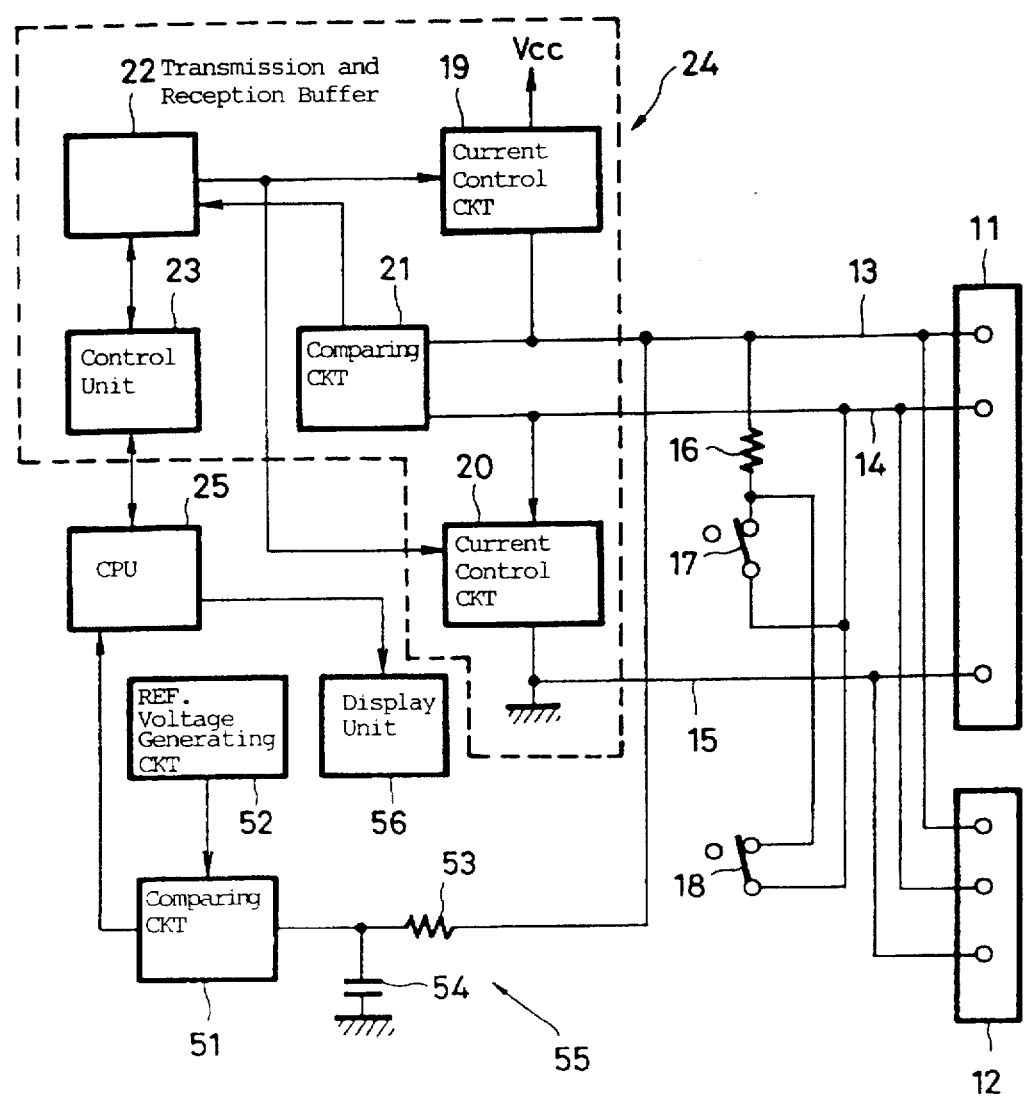
FIG. 11 is a block diagram showing other example of an arrangement of a circuit housed in the electronic device system according to the present invention.

While the voltage of the balancing signal line (13) is monitored by the comparing circuit (51) as described above, the voltage of the balancing signal line (14) can be monitored by the comparing circuit (51) as shown in FIG. 10, for example. In this case, the reference voltage output from the reference voltage generating circuit (52) is set to a value represented by $V_{1L}$ in FIGS. 7 and 9. Specifically, this reference voltage is a voltage in the logic level 1 of the balancing signal line (14) and set to an intermediate value between a value obtained when the correct connection is made and a value obtained when the erroneous connection is made.

While the output of the comparing circuit (51) is integrated by the integrating circuit (55) in the embodiment shown in FIG. 3, the voltage of the balancing signal line (13) can be integrated by the integrating circuit (55) and supplied to the comparing circuit (51), in which it is compared with the reference voltage output from the reference voltage generating circuit (52). In this case, the reference voltage output from the reference voltage generating circuit (52) is set to an intermediate value between a value obtained when the correct connection is made and a value obtained when the erroneous connection is made.

Figure 12:
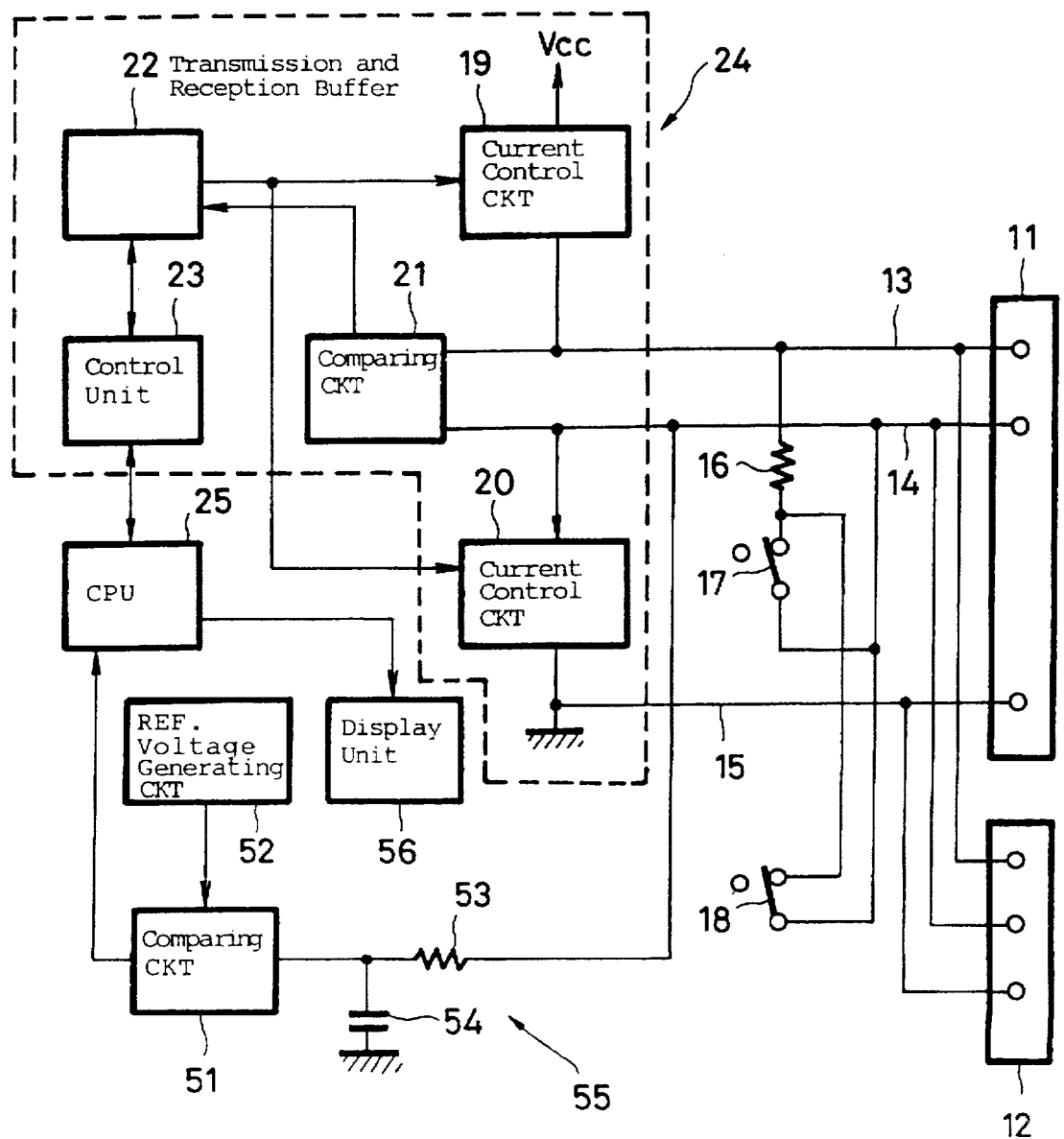
FIG. 12 is a block diagram showing a further example of an arrangement of a circuit housed in the electronic device system according to the present invention.

Also in this case, as shown in FIG. 12, for example, the voltage of the balancing signal line (14) instead of the balancing signal line (13) can be integrated by the integrating circuit (55) and supplied to the comparing circuit (51).

Figure 13:
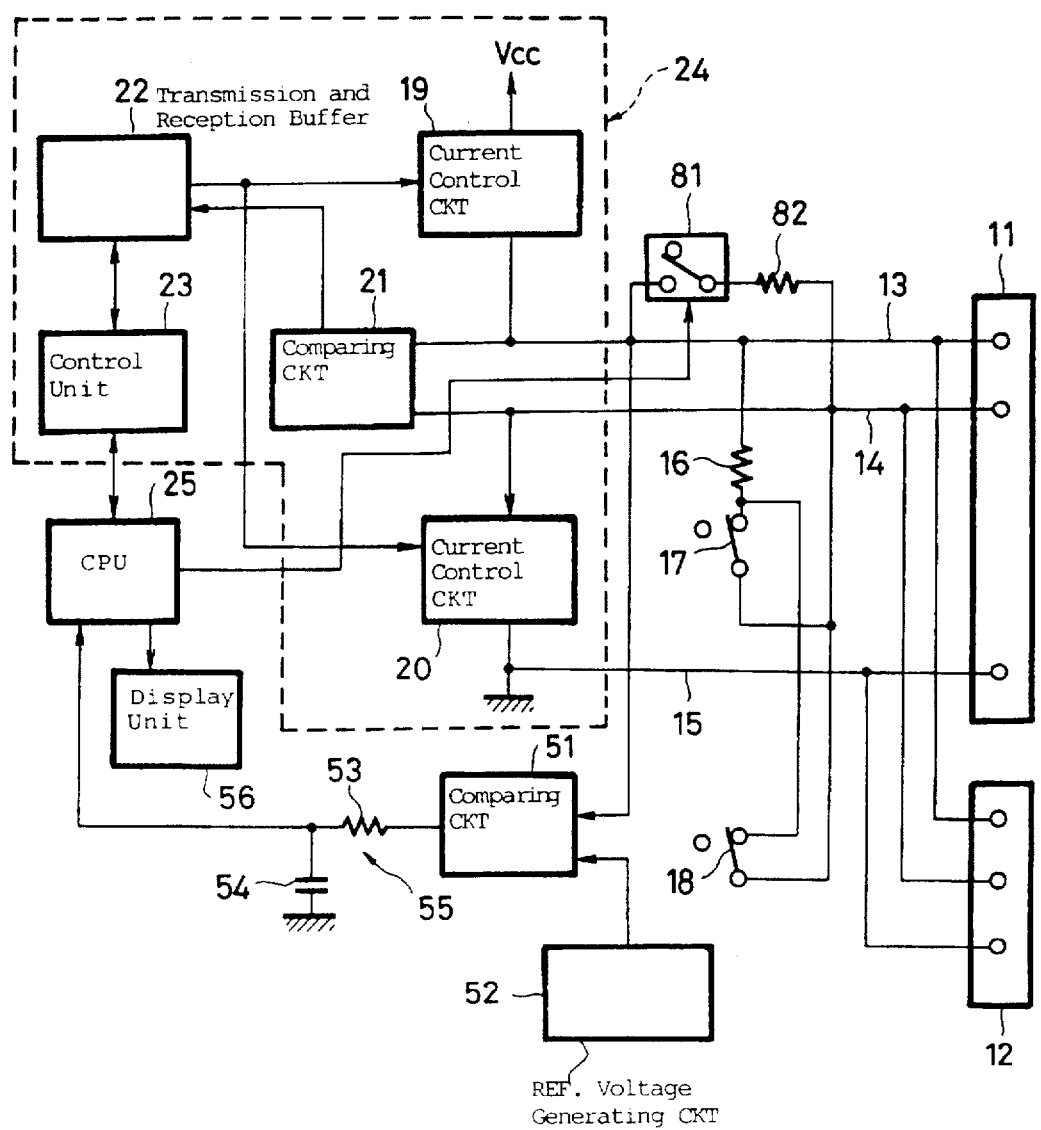
FIG. 13 is a block diagram showing a yet further example of an arrangement of a circuit housed in the electronic device system according to the present invention.

FIG. 13 shows a further embodiment. In this embodiment, a resistor (82) is connected between the balancing signal lines (13) and (14) through a switch (81). This switch (81) is turned on or off under the control of the CPU (25). The rest of the arrangement is similar to that of FIG. 3.

Figure 14:
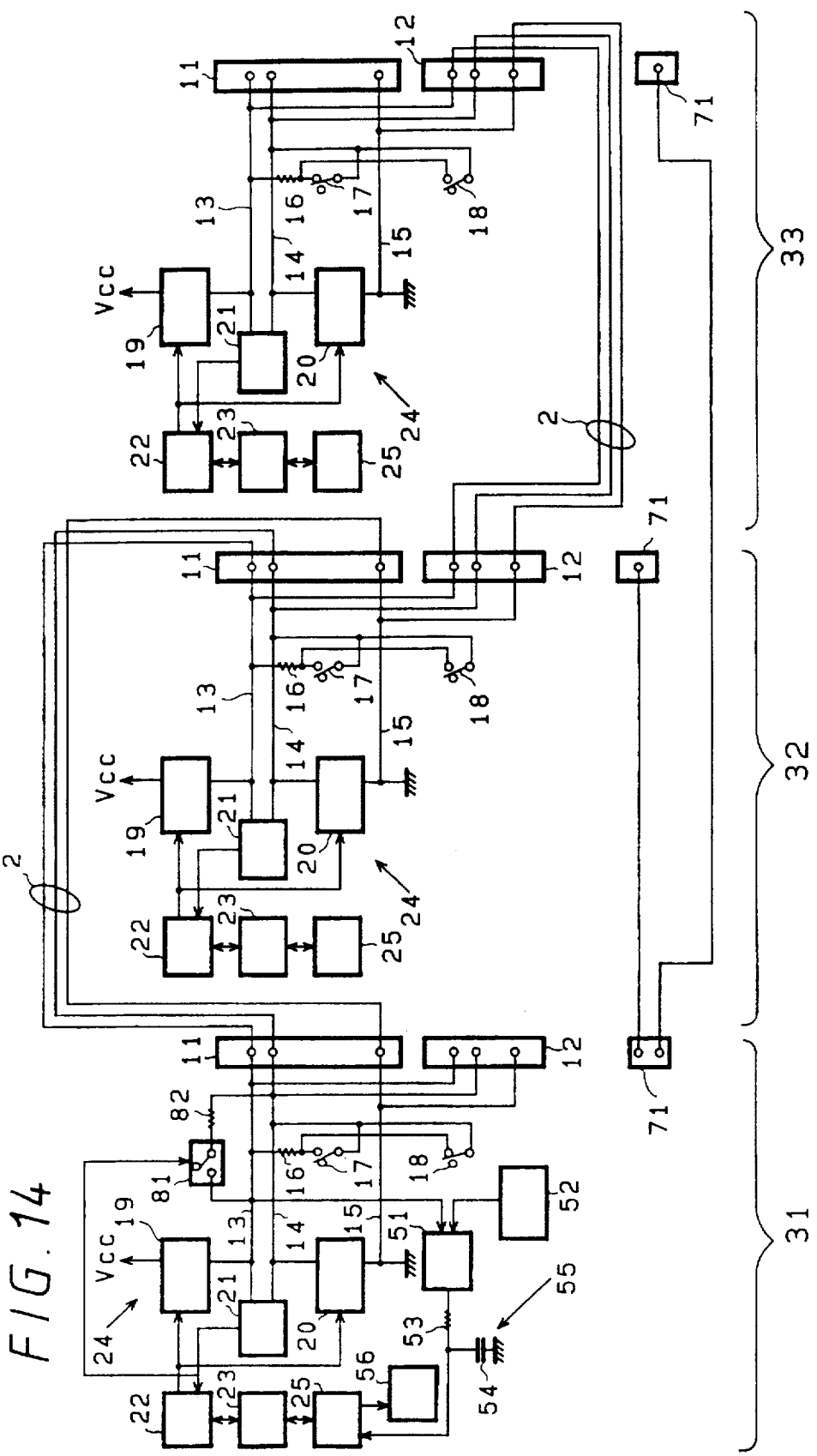
FIG. 14 is a block diagram showing a connection example of the electronic device system housing the circuit according to the embodiment shown in FIG. 13.

FIG. 14 shows an example of a connection made when the AV center (31) houses the circuit shown in FIG. 13. The connected state is similar to that shown in FIG. 5.

Figure 15:
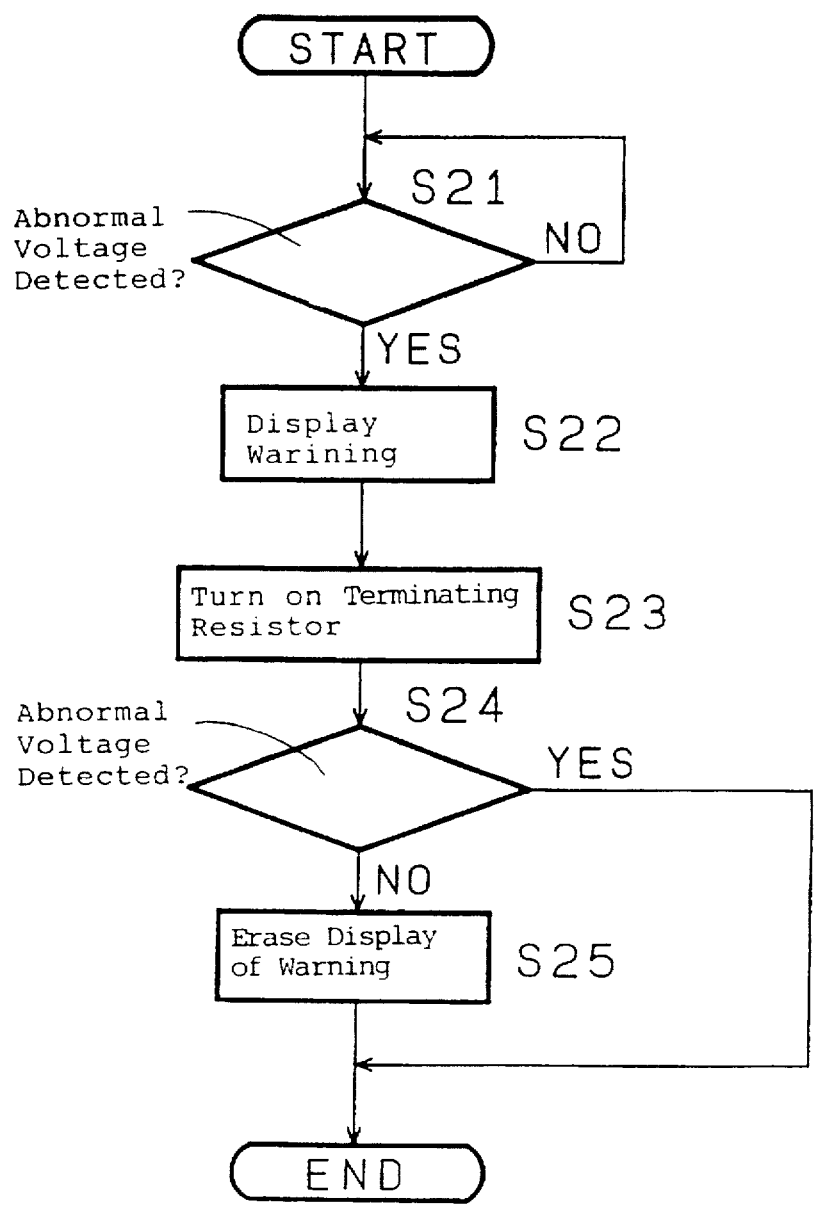
FIG. 15 is a flowchart used to explain an operation of the embodiment shown in FIG. 14.

An operation of the embodiment shown in FIG. 14 will be described with reference to a flowchart of FIG. 15. Initially, it is determined in step S21 whether or not the abnormal voltage is detected. Specifically, if the erroneous connection is made similarly as described above, then the comparing circuit (51) outputs a signal of high level. At that time, the processing proceeds to step S22, whereat the display unit (56) displays a warning of "Connection of bus-line is abnormal".

The processing proceeds to step S23, whereat the CPU (25) turns on the switch (81) to connect the resistor (82) between the balancing signal lines (13) and (14). A value of the resistor (82) is set to a value corresponding to a parallel synthesized value of the two resistors (16) shown in FIG. 20. Accordingly, the voltages output to the balancing signal lines (13) and (14) become the same value as the value obtained when the correct connection is made. As a result, even when the erroneous connection is made, it becomes possible to correctly detect the transmitted command signal. Consequently, even in the erroneously-connected state, the AV devices can be operated correctly, thereby preventing a malfunction.

Then, the processing proceeds to step S24, whereat it is further determined whether or not the comparing circuit (51) still continues outputting the signal of high level. In general, the switch (81) is turned on and the resistor (82) is connected between the balancing signal lines (13) and (14), whereby the signal output from the comparing circuit (51) is changed to the low level. At that time, the processing proceeds to step S25, whereat the warning that had been displayed in step S22 is erased.

On the other hand, if the output of the comparing circuit (51) is still held at high level even when the switch (81) is turned on and the resistor (82) is connected between the balancing signal lines (13) and (14), then other abnormality is expected. Then, the processing of step S25 is skipped. Specifically, the warning that had been displayed at step S22 is kept being displayed. Accordingly, if the user confirms the connected state of the D2B bus (2) and detects an erroneous connection, then the user can correct such erroneous connection to the correct one.

The present invention is not limited to the AV devices and can be applied to all sorts of electronic devices to which the external bus can be connected.

As described above, according to the present invention, since the state of the electronic device is checked by inquiring the electronic device through the external bus, even after the rear cover was attached to the electronic device body, the connection of the electronic device can be inspected without making the operation unstable.

Further, since the state of the electronic device is set through the external bus, even after the rear covers was attached to the electronic device body, the state of the electronic device can be set without making the operation unstable.

Furthermore, since the level of the command signal transmitted to the external bus is detected and the predetermined warning is generated in response to the detected result, if there is any erroneous connection, then the user can learn such erroneous connection and is urged to make a correct connection.

I claim:

1. An electronic inspection device for inspecting audio/video apparatus composed of a plurality of separate audio/video devices that can be connected in at least one correct manner and at least one incorrect manner, said electronic inspection device comprising:

a signal transmitter for transmitting a request signal to a selected audio/video device via a bus-line to which said selected audio/video device is connected;

a signal receiver for receiving a device output signal from said selected audio/video device via said bus-line and producing a receiver output signal, said device output signal being produced by said selected audio/video device in response to said request signal from said signal transmitter; and a state analyzing unit for analyzing said receiver output signal, wherein said state analyzing unit determines the correct or incorrect connection of said selected audio/video device based on said receiver output signal obtained from said signal receiver.

2. An audio/video device comprising:
an external bus;

a control unit for executing a receive process to receive a signal from said external bus; and a memory unit for storing information corresponding to said signal received during said receive process, wherein said control unit identifies said signal received during said receive process and stores said information corresponding to said signal received during said receive process in said memory unit only when said signal received during said receive process is a state setting signal;

wherein said state setting signal sets a state selected from the group consisting of a destination setting value, a specification setting value, and a channel setting value.

3. The electronic device according to claim 2, wherein said memory unit comprises a nonvolatile memory.

4. An audio/video device state setting system comprising:

an electronic device state setting apparatus having a signal transmitter for transmitting a signal via a bus-line to which an electronic device is connected and setting a state of said electronic device based on a signal transmitted from said signal transmitter;

an external bus;

a control unit for executing a receive process to receive a signal supplied thereto from said external bus; and a memory unit for storing information corresponding to said signal received during said receive process, wherein said control unit identifies said signal received during said receive process and stores said information corresponding to said signal received during said receive process in said memory unit when said signal received during said receive process is a state setting signal, wherein said state setting signal sets a state selected from the group consisting of a destination setting value, a specification setting value, and a channel setting value.

5. The electronic device state setting system according to claim 4, wherein said bus-line is a serial bus.

6. An audio/video device comprising:

an external bus;

means for detecting an amplitude of a signal supplied thereto from said external bus, said signal supplied via a bus-line; and warning information generating means, wherein said warning information generating means generates warning information when said amplitude detected by said means for detecting lies out of a predetermined range, wherein said warning information generating means includes a comparator for comparing a reference voltage and a bus-line voltage to produce a comparison result; and an integrator for integrating the comparison result to produce said warning information.

7. The electronic device according to claim 6, wherein said bus-line is a serial bus and said signal is detected by a transmission signal line.

8. The electronic device according to claim 6, wherein said bus-line is a serial bus and said signal is detected by a reception signal line.

9. An electronic device comprising:

an external bus;

means for detecting an amplitude of a signal supplied thereto from said external bus, said signal supplied via a bus-line; and warning information generating means, wherein said warning information generating means generates warning information when said amplitude detected by said means for detecting lies out of a predetermined range, wherein said warning information is generated by comparing a reference voltage and a bus-line voltage to produce a comparison result that is integrated;

further comprising a display device wherein said warning information is displayed on said display device when said warning information is generated by said warning information generating means.

10. The electronic device according to claim 9, wherein an amplitude of said signal is detected again after said warning information is generated and displayed, and when said detected amplitude falls within said predetermined range said displayed warning information is erased from said display device.

11. An electronic device comprising:

an external bus;

means for detecting an amplitude of a signal supplied thereto from said external bus, said signal supplied via a bus-line; and warning information generating means, wherein said warning information generating means generates warning information when said amplitude detected by said means for detecting lies out of a predetermined range, wherein said warning information is generated by comparing a reference voltage and a bus-line voltage to produce a comparison result that is integrated;

further comprising a first reference voltage and a second reference voltage for determining said predetermined range of amplitude such that when a signal voltage is lower than said first reference voltage and higher than said second reference voltage, said amplitude of said signal falls within said predetermined range.

12. An electronic device comprising:

an external bus;

means for detecting an amplitude of a signal supplied thereto from said external bus, said signal supplied via a bus-line; and warning information generating means, wherein said warning information generating means generates warning information when said amplitude detected by said means for detecting lies out of a predetermined range, wherein said warning information is generated by comparing a reference voltage and a bus-line voltage to produce a comparison result that is integrated;

wherein said bus-line voltage is integrated before said bus-line voltage is compared with said reference voltage.

13. An electronic device comprising:

an external bus;

means for detecting an amplitude of a signal supplied thereto from said external bus, said signal supplied via a bus-line; and warning information generating means, wherein said warning information generating means generates warning information when said amplitude detected by said means for detecting lies out of a predetermined range, wherein said warning information is generated by comparing a reference voltage and a bus-line voltage to produce a comparison result that is integrated;

further comprising a terminating resistor and a control unit for controlling a connection of said terminating resistor to said bus-line, wherein said control unit connects said terminating resistor to said bus-line when said warning information is generated by said warning information generating means.

14. The electronic device according to claim 13, further comprising a display device for displaying said warning information when said warning information is generated by said warning information generating means and said terminating resistor is connected to said bus-line.

15. The electronic device according to claim 14, wherein an amplitude of said signal is detected again after said terminating resistor is connected to said bus-line, and when said amplitude detected again after said terminating resistor is connected to said bus-line falls within said predetermined range said displayed warning information generated by said warning information generating means is erased from said display device.

* * * * *